(12) United States Patent
Wu et al.

(10) Patent No.: US 11,917,427 B2
(45) Date of Patent: Feb. 27, 2024

(54) MULTI-BEAM BASE STATION ANTENNAS HAVING WIDEBAND RADIATING ELEMENTS

(71) Applicant: CommScope Technologies LLC, Hickory, NC (US)

(72) Inventors: Bo Wu, Suzhou (CN); Xiangyang Ai, Plano, TX (US); Peter Bisiules, La Grange Park, IL (US); Hangsheng Wen, Suzhou (CN); Joy Huang, Plano, TX (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/101,166

(22) Filed: Jan. 25, 2023

(65) Prior Publication Data

US 2023/0164588 A1    May 25, 2023

Related U.S. Application Data

(63) Continuation of application No. 17/241,271, filed on Apr. 27, 2021, now Pat. No. 11,595,827, which is a
(Continued)

(51) Int. Cl.
*H04W 16/28* (2009.01)
*H01Q 1/24* (2006.01)
(Continued)

(52) U.S. Cl.
CPC .............. *H04W 16/28* (2013.01); *H01Q 1/24* (2013.01); *H01Q 1/246* (2013.01); *H01Q 3/34* (2013.01);
(Continued)

(58) Field of Classification Search
CPC .......... H01Q 15/14; H01Q 3/34; H01Q 1/246; H01Q 19/106; H01Q 1/24; H01Q 19/10; H04W 16/28; H04W 88/08
(Continued)

(56) References Cited

U.S. PATENT DOCUMENTS 5,966,102 A    10/1999  Runyon
6,252,560 B1    6/2001  Tanaka et al.
(Continued)

FOREIGN PATENT DOCUMENTS

CN    101427418 A    5/2009
CN    103367932 A    10/2013
(Continued)

OTHER PUBLICATIONS

"Extended European Search Report for European Application No. 19935730.2, dated Dec. 16, 2022, 18 pages".
(Continued)

*Primary Examiner* — Hai V Tran
(74) *Attorney, Agent, or Firm* — Myers Bigel, P.A

(57) ABSTRACT

A twin beam base station antenna includes a first array that has a plurality of columns of first frequency band radiating elements, the first array configured to form a first antenna beam that provides coverage throughout a first sub-sector of a three-sector base station. The radiating elements in a first of the columns in the first array have a first azimuth boresight pointing direction and the radiating elements in a second of the columns in the first array have a second azimuth boresight pointing direction that is offset from the first azimuth boresight pointing direction by at least 10°. The radiating elements in the second of the columns in the first array are electrically steered.

15 Claims, 17 Drawing Sheets

Related U.S. Application Data continuation of application No. 16/956,229, filed as application No. PCT/CN2019/092788 on Jun. 25, 2019, now Pat. No. 11,019,506.

(51) Int. Cl.
- *H01Q 3/34* (2006.01)
- *H01Q 15/14* (2006.01)
- *H01Q 19/10* (2006.01)
- *H04W 88/08* (2009.01)
- *H01Q 21/24* (2006.01)

(52) U.S. Cl.
CPC ............ *H01Q 15/14* (2013.01); *H01Q 19/10* (2013.01); *H01Q 19/106* (2013.01); *H01Q 21/24* (2013.01); *H04W 88/08* (2013.01)

(58) Field of Classification Search
USPC .......................................................... 343/835
See application file for complete search history.

(56) References Cited

U.S. PATENT DOCUMENTS

| | | |
|---|---|---|
| 6,992,621 B2 | 1/2006 | Casas et al. |
| 8,237,619 B2 | 8/2012 | Vassilakis et al. |
| 2006/0145921 A1 | 7/2006 | Ranta et al. |
| 2006/0244675 A1 | 11/2006 | Elliot et al. |
| 2007/0205955 A1* | 9/2007 | Korisch ................. H01Q 21/08 343/797 |
| 2009/0195471 A1* | 8/2009 | Semonov ............... H01Q 1/246 343/810 |
| 2009/0312057 A1* | 12/2009 | Moon .................... H01Q 1/246 455/562.1 |
| 2011/0205119 A1 | 8/2011 | Timofeev et al. |
| 2012/0280874 A1 | 11/2012 | Kim et al. |
| 2016/0013563 A1 | 1/2016 | Timofeev et al. |
| 2017/0195018 A1* | 7/2017 | Ma ......................... H01Q 25/00 |
| 2020/0411961 A1 | 12/2020 | Kasani et al. |

FOREIGN PATENT DOCUMENTS

| | | |
|---|---|---|
| CN | 108448237 A | 8/2018 |
| WO | 2010059186 A2 | 5/2010 |
| WO | 2015006676 A1 | 1/2015 |

OTHER PUBLICATIONS

"International Search Report and Written Opinion of the International Searching Authority, International Application No. PCT/CN2019/092788, dated Mar. 23, 2020, 12 pp.".

* cited by examiner

MULTI-BEAM BASE STATION ANTENNAS HAVING WIDEBAND RADIATING ELEMENTS

CROSS-REFERENCE TO RELATED APPLICATIONS

The present application claims priority under 35 U.S.C. § 120 to, and is a continuation of, U.S. patent application Ser. No. 17/241,271, filed Apr. 27, 2021, which claims priority under 35 U.S.C. § 120 to, and is a continuation of, U.S. patent application Ser. No. 16/956,229, filed Jun. 19, 2020, which is a 35 U.S.C. § 371 national stage application of PCT Application No. PCT/CN2019/092788, filed on Jun. 25, 2019, the entire content of each of which is incorporated herein by reference as if set forth in their entireties.

FIELD OF THE INVENTION

The present invention generally relates to radio communications and, more particularly, to multi-beam base station antennas utilized in cellular and other communications systems.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

A common base station configuration is a "three sector" configuration in which the cell is divided into three 120° sectors in the azimuth plane, and the base station includes three base station antennas that provide coverage to the three respective sectors. The azimuth plane refers to a horizontal plane that bisects the base station antenna and that is parallel to the plane defined by the horizon. In a three sector configuration, the antenna beams generated by each base station antenna typically have a Half Power Beam Width ("HPBW") in the azimuth plane of about 65° so that the antenna beams provide good coverage throughout a 120° sector. Typically, each base station antenna will include a vertically-extending column of radiating elements that is typically referred to as a "linear array." Each radiating element in the linear array may have a HPBW of approximately 65° so that the antenna beam generated by the linear array will provide coverage to a 120° sector in the azimuth plane. In many cases, the base station antenna may be a so-called "multi-band" antenna that includes different arrays of radiating elements that operate in different frequency bands.

Sector-splitting refers to a technique where the coverage area for a base station is divided into more than three sectors in the azimuth plane, such as six, nine or even twelve sectors. A six-sector base station will have six 60° sectors in the azimuth plane. Splitting each 120° sector into two sub-sectors increases system capacity because each antenna beam provides coverage to a smaller area, and therefore can provide higher antenna gain and/or allow for frequency reuse within a 120° sector. In six-sector sector-splitting applications, a single twin beam antenna is typically used for each 120° sector. The twin beam antenna generates separate antenna beams that each have a reduced size in the azimuth plane (typically about half the size of a normal sector antenna beam) and that each point in different directions in the azimuth plane (typically about −30° and 30° from the boresight pointing direction of the antenna) for at least one frequency band, thereby splitting the sector into two smaller sub-sectors.

SUMMARY

Pursuant to embodiments of the present invention, twin beam base station antennas are provided that are configured to split a sector of a three-sector base station into first and second sub-sectors. These antennas include a first array that has a plurality of columns of first frequency band radiating elements. The first array is configured to form a first antenna beam that provides coverage throughout the first sub-sector. The radiating elements in a first of the columns in the first array have a first azimuth boresight pointing direction and the radiating elements in a second of the columns in the first array have a second azimuth boresight pointing direction that is offset from the first azimuth boresight pointing direction by at least 10°. The radiating elements in the second of the columns in the first array are electrically steered.

In some embodiments, the antenna may further include a second array that has a plurality of columns of first frequency band radiating elements, the second array configured to form a second antenna beam that provides coverage throughout the second sub-sector. In such embodiments, the antenna may also include a column of second frequency band radiating elements, the column of second frequency band radiating elements configured to generate a third antenna beam having an azimuth half power beamwidth that is about twice an azimuth half power beamwidth of the first antenna beam.

In some embodiments, the antenna may further include an additional column of first frequency band radiating elements that is configured to generate a fourth antenna beam having an azimuth half power beamwidth that is about twice an azimuth half power beamwidth of the first antenna beam.

In some embodiments, the antenna may further include a backplane that includes a reflector, where the first of the columns in the first array is on a first section of the reflector that is perpendicular to an azimuth boresight pointing direction of the twin beam base station antenna and the second of the columns in the first array is on a second section of the reflector that is angled at least 15° from the first section.

In some embodiments, a first of the columns in the second array is on a third section of the reflector that is perpendicular to the azimuth boresight pointing direction of the twin beam base station antenna and a second of the columns in the second array is on a fourth section of the reflector that is angled at least 15° from the third section.

In some embodiments, a peak gain of the first antenna beam may occur at an azimuth angle that is offset by at least 30° from an azimuth angle where a peak gain of the second antenna beam occurs.

In some embodiments, the radiating elements in the second of the columns in the first array may be electrically steered toward the first azimuth boresight pointing direction.

In some embodiments, the radiating elements in the second of the columns in the first array may be electrically steered in the azimuth direction by a fixed amount.

In some embodiments, the antenna may further include a shared column of radiating elements that is part of the first array and the second array.

In some embodiments, the antenna may further include first and second columns of second frequency band radiating elements. The first column of second frequency band radiating elements may be on a first portion of the reflector that is perpendicular to an azimuth boresight pointing direction of the twin beam base station antenna and the second column of second frequency band radiating elements may be on a second portion of the reflector that is perpendicular to an azimuth boresight pointing direction of the twin beam base station antenna. In some embodiments, the first portion of the reflector and the second portion of the reflector may each be positioned rearwardly of a forward most portion of the reflector.

In some embodiments, the antenna may further include a backplane that includes a reflector, where the reflector includes a first longitudinally-extending section that is perpendicular to an azimuth boresight pointing direction of the twin beam base station antenna, a second longitudinally-extending section that directly connects to a left side of the first longitudinally-extending section, the second longitudinally-extending section being oriented at a first oblique angle with respect the first longitudinally-extending section, and a third longitudinally-extending section that directly connects to a right side of the first longitudinally-extending section, the third longitudinally-extending section being oriented at a second oblique angle with respect to the first longitudinally-extending section. In some such embodiments, the first angle may be within 5° of the second angle.

In some embodiments, the first array may be on a right side of the twin beam base station antenna and the first sub-sector may be the left side of the sector.

Pursuant to further embodiments of the present invention, base station antennas are provided that include a first RF port, a first array that includes first and second columns of radiating elements that are both coupled to the first RF port, and a backplane that includes a reflector. The reflector has a first longitudinally extending section that is perpendicular to the azimuth boresight pointing direction of the base station antenna and a second longitudinally extending section that is angled in the azimuth plane by at least 15° from the first longitudinally extending section of the reflector. The radiating elements in the first column are mounted to extend forwardly from the first longitudinally extending section of the reflector, and the radiating elements of the second column are mounted to extend forwardly from the second longitudinally extending section of the reflector. The first and second columns of radiating elements are configured to generate respective first and second radiation patterns that have pointing directions that are within about 10° of each other in the azimuth plane.

In some embodiments, the first and second radiation patterns may form at least part of a first antenna beam that provides coverage to half of a sector of a three-sector base station.

In some embodiments, the antenna may further include a second RF port and a second array that includes third and fourth columns of radiating elements that are coupled to the second RF port. In such embodiments, the reflector may further include a third longitudinally extending section that is spaced apart from the first longitudinally-extending section and that is perpendicular to the azimuth boresight pointing direction of the base station antenna, and a fourth longitudinally extending section that is angled in the azimuth plane by at least 15° from the third longitudinally extending section of the reflector. The radiating elements in the third column may be mounted to extend forwardly from the third longitudinally extending section of the reflector, and the radiating elements of the fourth column may be mounted to extend forwardly from the fourth longitudinally extending section of the reflector.

In some embodiments, the radiating elements in the first and second columns of radiating elements may be first frequency band radiating elements, and the base station antenna may further include a column of second frequency band radiating elements, the column of second frequency band radiating elements configured to generate a third antenna beam having an azimuth half power beamwidth that is about twice an azimuth half power beamwidth of the first antenna beam.

In some embodiments, the antenna may further include an additional column of first frequency band radiating elements, the additional column of first frequency band radiating elements configured to generate a fourth antenna beam having an azimuth half power beamwidth that is about twice an azimuth half power beamwidth of the first antenna beam.

In some embodiments, the radiating elements in the second column of radiating elements may be electrically steered in the azimuth direction and the radiating elements in the first column of radiating elements may not be electrically steered in the azimuth direction.

In some embodiments, the antenna may further include a shared column of radiating elements that is coupled to the first RF port and to the second RF port, the shared column of radiating elements being part of the first array and part of the second array.

In some embodiments, the first array may on a right side of the twin beam base station antenna and the first sub-sector may be the left side of the sector.

Pursuant to additional embodiments of the present invention, base station antennas are provided that include a reflector that has first through fifth longitudinally-extending sections and first through fifth columns of first frequency band radiating elements that are mounted to extend forwardly from the respective first through fifth longitudinally-extending sections of the reflector. The first longitudinally-extending section of the reflector directly connects to the second longitudinally-extending section of the reflector at a first angle that is at least 5°, the second longitudinally-extending section of the reflector directly connects to the third longitudinally-extending section of the reflector at a second angle that is at least 5°, the third longitudinally-extending section of the reflector directly connects to the fourth longitudinally-extending section of the reflector at a third angle that is at least 5°, and the fourth longitudinally-extending section of the reflector directly connects to the fifth longitudinally-extending section of the reflector at a fourth angle that is at least 5°. Each of the first through fifth longitudinally-extending sections of the reflector defines a respective plane, and axes that are perpendicular to each respective plane are each angled less than 45° in an azimuth plane with respect to a boresight pointing direction of the base station antenna.

In some embodiments, the antenna may further include first and second RF ports, and the first through third columns of radiating elements may be are coupled to the first RF port, and the fourth and fifth columns of radiating elements are coupled to the second RF port. In some embodiments, the third column of radiating elements may also be coupled to the second RF port.

In some embodiments, the first through third columns of radiating elements may be part of a first array that is configured to form a first antenna beam that provides coverage throughout a first sub-sector of a sector of a three-sector base station and the fourth and fifth columns of radiating elements may be part of a second array that is configured to form a second antenna beam that provides coverage throughout a second sub-sector of the sector.

In some embodiments, a peak gain of the first antenna beam may occur at an azimuth angle that is offset by at least 30° from an azimuth angle where a peak gain of the second antenna beam occurs.

In some embodiments, the radiating elements in the second column of radiating elements may be electrically steered in the azimuth direction and the radiating elements in the first column of radiating elements may not be electrically steered in the azimuth direction.

In some embodiments, the antenna may further include a column of second frequency band radiating elements that is configured to generate a third antenna beam having an azimuth half power beamwidth that is about twice an azimuth half power beamwidth of the first antenna beam.

In some embodiments, the antenna may further include first and second columns of second frequency band radiating elements, and the first column of second frequency band radiating elements may be on a first portion of the reflector that is perpendicular to an azimuth boresight pointing direction of the twin beam base station antenna and the second column of second frequency band radiating elements may be on a second portion of the reflector that is perpendicular to an azimuth boresight pointing direction of the twin beam base station antenna.

In some embodiments, the radiating elements in at least some of the first through fifth columns of radiating elements may be both mechanically and electrically steered in the azimuth direction.

Pursuant to further embodiments of the present invention, twin beam base station antennas are provided that include first and second RF ports, an array that includes a plurality of columns of first frequency band radiating elements that are configured to form an antenna beam that provides coverage to a predefined area, and a beamforming network coupled between the first and second RF ports and the array, the beamforming network including a first frequency dependent power divider.

In some embodiments, the beamforming network includes a 90° hybrid coupler having a first input coupled to the first RF port, a second input coupled to the second RF port, a first output coupled to the first frequency dependent power divider and a second output coupled to the second frequency dependent power divider.

In some embodiments, a first output of the first frequency dependent power divider is coupled to a first of the first frequency band radiating elements through a 180° phase shifter and a second output of the first frequency dependent power divider is coupled to a second of the first frequency band radiating elements.

In some embodiments, a first output of the second frequency dependent power divider is coupled to a third of the first frequency band radiating elements through a 180° phase shifter and a second output of the second frequency dependent power divider is coupled to a fourth of the first frequency band radiating elements.

In some embodiments, the first frequency dependent power divider may comprise a power divider having a filter on a first output thereof.

In some embodiments, the first frequency dependent power divider may comprise a power divider that has a first output coupled to a first input of a 90° hybrid coupler and a second output that is coupled to a second input of the 90° hybrid coupler via a delay line.

In some embodiments, the array may include a total of four columns or a total of five columns of first frequency band radiating elements.

Pursuant to yet additional embodiments of the present invention, twin beam base station antennas are provided that are configured to provide coverage to a sector of a three-sector base station. These antennas include first and second RF ports, a first array that includes at least two columns of radiating elements that are coupled to the first RF port via a first feed network, a second array that includes at least two columns of radiating elements that are coupled to the second RF port via a second feed network, and a shared column of radiating elements that is coupled to the first RF port via the first feed network and to the second RF port via the second feed network. The first array is configured to generate a first antenna beam that provides coverage throughout a first sub-sector of the sector, and the second array is configured to generate a second antenna beam that provides coverage throughout a second sub-sector of the sector.

In some embodiments, the shared column of radiating elements may be between the at least two columns of radiating elements of the first array and the at least two columns of radiating elements of the second array.

In some embodiments, the first feed network may include a plurality of variable power dividers that are configured to scan a first antenna beam that is generated by the first array between 20° and 40° in the azimuth plane.

Pursuant to still further embodiments of the present invention, twin beam base station antennas are provided that are configured to provide coverage to a sector of a three-sector base station. These antennas include a first low-band RF port, second and third high-band RF ports, a backplane that includes a reflector, the reflector having a first longitudinally extending section that is perpendicular to the azimuth boresight pointing direction of the base station antenna, a second longitudinally extending section that is angled at least 15° from the first section, and a third longitudinally extending section that is angled at least 15° from the first section, the first longitudinally extending section positioned between the second longitudinally extending section and the third longitudinally extending section, a first column of low-band radiating elements that is coupled to the third RF port via a third feed network, a second array that includes at least three columns of high-band radiating elements that are coupled to the first RF port via a second feed network, the second array mounted to extend forwardly from the second longitudinally extending section of the reflector, and a third array that includes at least three columns of high-band radiating elements that are coupled to the second RF port via a second feed network, the third array mounted to extend forwardly from the third longitudinally extending section of the reflector.

In some embodiments, the first linear array of low-band radiating elements the first array may be mounted to extend forwardly from the first longitudinally extending section of the reflector.

In some embodiments, the reflector may be a generally V-shaped reflector.

In some embodiments, the second and third longitudinally extending sections of the reflector may extend forwardly from the first longitudinally extending section of the reflector.

In some embodiments, the second and third longitudinally extending sections of the reflector may extend rearwardly from the first longitudinally extending section of the reflector.

In some embodiments, the first array of radiating elements may be configured to form a first antenna beam that provides coverage throughout a sub-sector having a first azimuth half power beamwidth, and the base station antenna may further include an additional column of high-band radiating elements that is configured to generate a fourth antenna beam having an azimuth half power beamwidth that is about twice the first azimuth half power beamwidth.

Pursuant to further embodiments of the present invention, base station antennas are provided that include first and second RF ports, first through fifth columns of radiating elements, and a beamforming network. Three of first through fifth columns of radiating elements are coupled to both the first RF port and the second RF port through the beamforming network, another one of the first through fifth columns of radiating elements is coupled to the first RF port and not to the second RF port, and the last of the first through fifth columns of radiating elements is coupled to the second RF port and not to the first RF port.

In some embodiments, the first through fifth columns of radiating elements may be arranged in numerical order on a reflector, and the three of the first through fifth columns of radiating elements that are coupled to both the first RF port and the second RF port through the beamforming network are the second, third and fourth columns of radiating elements.

In some embodiments, the beamforming network may comprise a 90° hybrid coupler.

In some embodiments, the second and fourth columns of radiating elements may be coupled to a first output of the beamforming network, and the third column of radiating elements may be coupled to a second output of the beamforming network.

In some embodiments, a frequency dependent power divider may be coupled between the first RF port and the first column of radiating elements.

In some embodiments, the reflector may include first through third longitudinally-extending sections, and the first and third longitudinally-extending sections of the reflector are each angled with respect to the second longitudinally-extending section of the reflector. The first column of radiating elements may be mounted to extend forwardly from the first longitudinally-extending section of the reflector and the fifth column of radiating elements may be mounted to extend forwardly from the third longitudinally-extending section of the reflector.

In some embodiments, the second through fourth columns of radiating elements may be mounted to extend forwardly from the second longitudinally-extending section of the reflector.

In some embodiments, the second longitudinally-extending section of the reflector may be forward of the first and third longitudinally-extending sections of the reflector.

In some embodiments, the second longitudinally-extending section of the reflector may be rearward of the first and third longitudinally-extending sections of the reflector.

Pursuant to yet additional embodiments of the present invention, twin beam base station antennas are provided that are configured to split a sector of a three-sector base station into first and second sub-sectors. These antennas include a first array that includes a plurality of columns of first frequency band radiating elements that are mechanically steered in a first direction from an azimuth boresight pointing direction of the antenna and that are electrically steered further in the first direction. The first array is configured to form a first antenna beam that provides coverage throughout the first sub-sector.

In some embodiments, the antenna may further include a second array that includes a plurality of columns of first frequency band radiating elements that are mechanically steered in a second direction from an azimuth boresight pointing direction of the antenna and that are electrically steered further in the second direction. In such embodiments, the second array may be configured to form a second antenna beam that provides coverage throughout the second sub-sector.

In some embodiments, the antenna may further include a reflector that includes a first longitudinally-extending section that is angled between 5° and 20° in the azimuth plane from a plane that is perpendicular to the azimuth boresight pointing direction of the twin beam base station antenna.

In some embodiments, the first array may include first through third columns of radiating elements, each of which is mounted to extend forwardly from the first longitudinally-extending section of the reflector.

DETAILED DESCRIPTION

Several approaches have been used to implement twin beam antennas that generate first and second antenna beams that provide coverage to respective first and second sub-sectors of a 120° sector in the azimuth plane. In a first approach, first and second linear arrays of radiating elements are mounted within an antenna. The linear arrays are mechanically positioned or "steered" to have different azimuth pointing angles, typically by bending the reflector of the antenna on which the linear arrays are mounted. The first linear array is mechanically steered so that the peak radiation therefrom will be at the middle of the first sub-sector, and the second linear array is mechanically steered so that the peak radiation therefrom will be at the middle of the second sub-sector. Since the azimuth beamwidth of typical radiating elements is usually appropriate for covering a full 120° sector, an RF lens is mounted in front of the two linear arrays of radiating elements that narrows the azimuth beamwidth of each antenna beam by a suitable amount for providing service to a 60° sub-sector. Unfortunately, however, the use of RF lenses may increase the size, weight and cost of the base station antenna, and the amount that the RF lens narrows the beamwidth is a function of frequency, making it difficult to obtain suitable coverage when wideband radiating elements are used that operate over a wide frequency range (e.g., radiating elements that operate over the full 1.7-2.7 GHz cellular frequency range).

Figure 1:
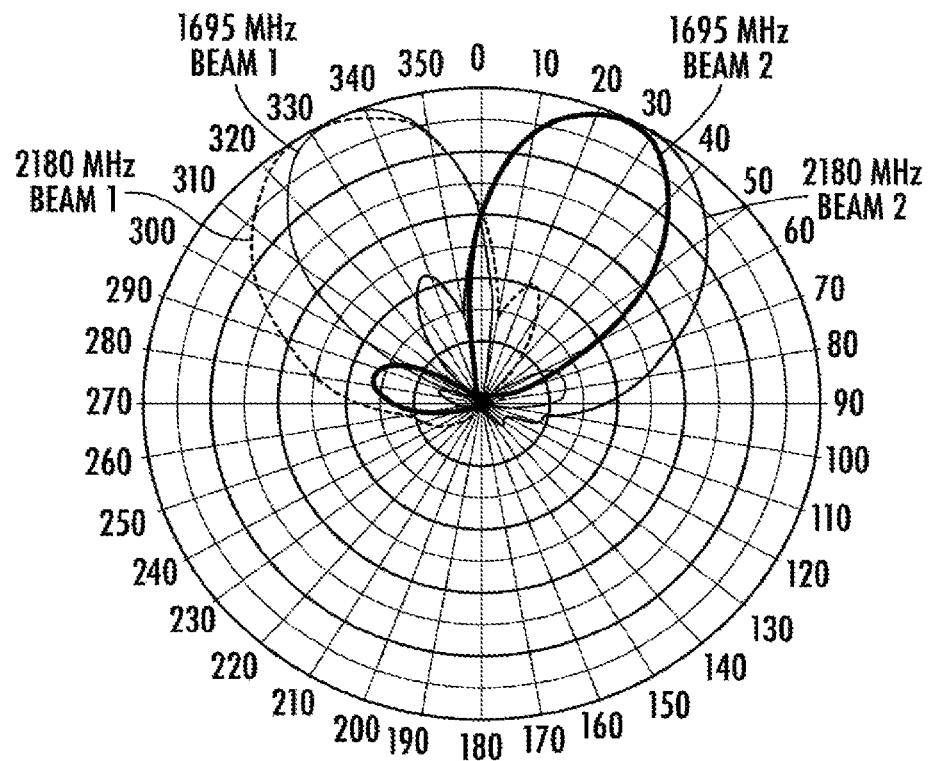
FIG. 1 is an azimuth pattern illustrating how the azimuth pointing direction and azimuth HPBW of the antenna beams formed by a conventional twin beam base station antenna that includes a Butler Matrix style beamforming network change with increasing frequency.

In a second approach, two or more linear arrays of radiating elements (typically 2-4 linear arrays) are mounted within an antenna where each linear array points toward the boresight pointing direction for the antenna. Two RF ports (per polarization) are coupled to the two or more linear arrays through a beamforming network such as a Butler Matrix. The beamforming network generates two separate antenna beams (per polarization) based on the RF signals input at the two RF ports, and the antenna beams are electrically steered off boresight at angles of about −30° and 30° to provide coverage to the two sub-sectors. With beamforming network based twin beam antennas, the pointing angle in the azimuth plane of each antenna beam and the HPBW of each antenna beam may vary as a function of the frequency of the RF signals input at the two RF ports. In particular, the azimuth pointing direction of the antenna beams (i.e., the azimuth angle where peak gain occurs) tends to move toward the boresight pointing direction of the antenna and the azimuth HPBW tends to get smaller with increasing frequency, as shown in FIG. 1. This can lead to a large variation as a function of frequency in the power level of the antenna beam at the outside edges of the sub-sectors, which is undesirable.

Figure 2:
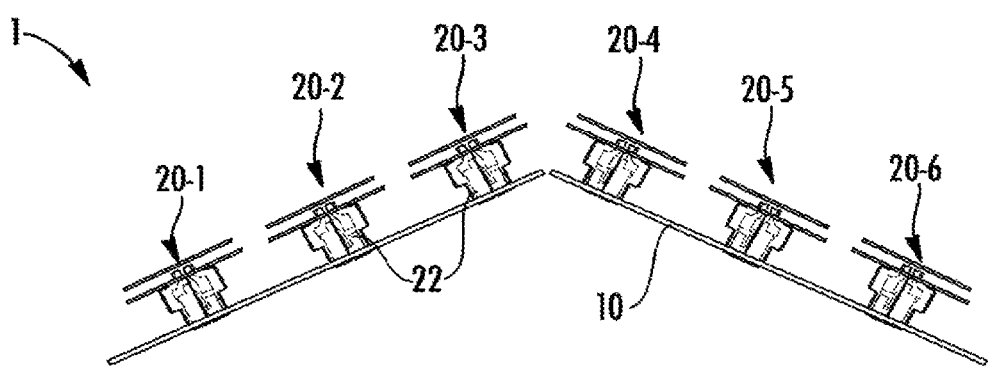
FIG. 2 is a schematic transverse cross-sectional view of a conventional multi-column mechanically-steered twin beam base station antenna.

In a third approach, several linear arrays of radiating elements are mounted on each panel of a V-shaped reflector to provide a sector-splitting twin beam antenna. A schematic transverse cross-sectional view of a conventional antenna 1 using this technique is provided in FIG. 2. As shown in FIG. 2, the antenna 1 includes six linear arrays of 20-1 through 20-6 of radiating elements 22 (only one radiating element of each array is visible in the cross-sectional view of FIG. 2) that are mounted to extend forwardly of a V-shaped reflector 10. While the antenna beams generated by the antenna 1 of FIG. 2 may vary less as a function of frequency as compared to the lensed and beamforming based twin beam antennas discussed above, the inclusion of six columns of radiating elements 22 may significantly increase the required width for the antenna 1, which is undesirable, and the V-shaped reflector 10 may not provide suitable mounting locations and/or room for one or more lower-band linear arrays of radiating elements that are often required by network operators.

Generally speaking, cellular operators desire twin beam antennas that have azimuth HPBW values of anywhere between 30°-38°, so long as the azimuth HPBW does not vary significantly (e.g., more than 12°) across the operating frequency band of the linear arrays that generate the twin beams. Likewise, the azimuth pointing angle of the antenna beam peak may vary anywhere between +/−26° to +/−33°, so long as the azimuth pointing angle does not vary significantly (e.g., more than 4°) across the operating frequency band of the linear arrays that generate the twin beams. The crossover point of the two antenna beams at the boresight pointing direction of the antenna (0°) may be about 9-12 dB below the peak gain. The azimuth roll off at the outer edges of the two 60° sub-sectors is preferably about 10-15 dB below the peak gain. The peak azimuth sidelobe levels should be at least 15 dB below the peak gain value.

Pursuant to embodiments of the present invention, improved twin beam (and other multi-beam) base station antennas are provided that overcome or mitigate various of the difficulties with the above-described conventional twin beam antennas. A number of different techniques may be used in the improved twin beam designs disclosed herein. These approaches can be mixed and matched, as will be discussed below, to meet desired performance, cost and/or size requirements for the twin beam base station antenna.

According to some embodiments of the present invention, twin beam base station antennas are provided that have multiple columns of radiating elements mounted on a backplane. The columns of radiating elements are connected to two RF ports (per polarization) through a beamforming network. The beamforming network is implemented using frequency-dependent power dividers in order to reduce the variation in the azimuth pointing direction and azimuth HPBW of the twin antenna beams.

According to further embodiments, twin beam antennas are provided that have multiple columns of radiating elements mounted on a backplane that are used to form two antenna beams per polarization. In some embodiments, the multiple columns may be divided into two sets of columns, with each set of columns being used to generate an independent antenna beam. In some implementations, the columns of radiating elements may be mounted on a flat backplane, and the two antenna beams formed by the columns of radiating elements may be electrically steered to point in the desired directions (e.g., −30° and 30°) in the azimuth plane. In other implementations, the columns of radiating elements may be mounted on a V-shaped (or generally V-shaped) backplane that mechanically steers the antenna beams so that electrical scanning of the antenna beams is not required. In other embodiments, the multiple columns of radiating elements may be divided into two sets of columns, with each set of columns being used to generate an independent antenna beam, where at least one, but less than all, of the columns is part of both sets of arrays. In some embodiments, one or more columns of lower-band radiating elements may also be included in the antenna. In still other embodiments, the antennas may include backplanes having complex shapes that use a combination of mechanical steering and electrical scanning to form a pair of sector-splitting antenna beams per polarization.

Pursuant to further embodiments, twin beam base station antennas are provided that have multiple columns of radiating elements mounted on a flat backplane. The columns of radiating elements are divided into two sets of columns that generate respective antenna beams (per polarization), where at least one, but less than all, of the columns of radiating elements is part of both sets of arrays. The beamforming network includes a 90° hybrid coupler as well as variable power dividers that are interposed between the RF ports and the 90° hybrid coupler. In yet further embodiments, the flat backplanes may be replaced with shaped backplanes so that a combination of mechanical steering and electrical steering is used to point the antenna beams in their desired azimuth pointing directions.

Embodiments of the present invention will now be discussed in greater detail with reference to FIGS. 3A-13, in which example embodiments are shown.

Figure 3A:
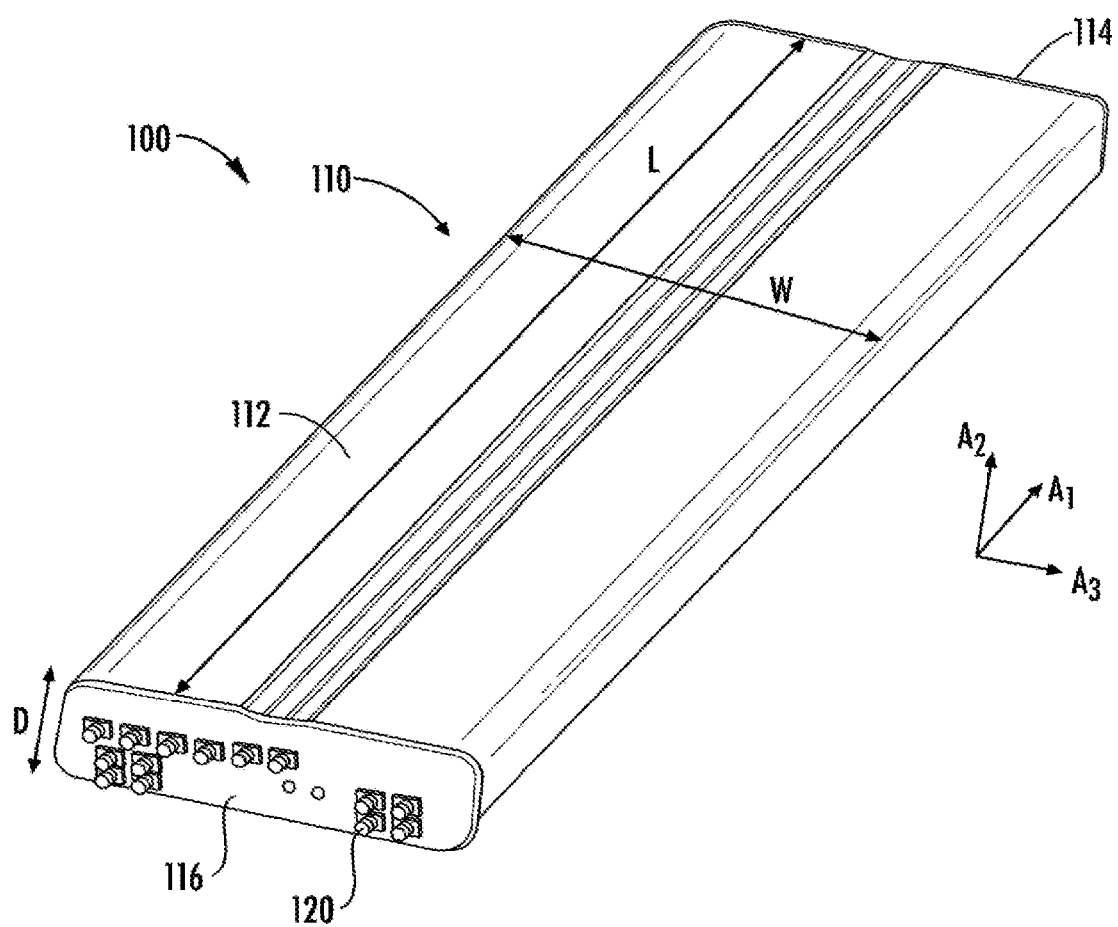
FIG. 3A is a perspective view of a twin beam base station antenna according to embodiments of the present invention that includes a beamforming network having frequency dependent power dividers.
Figure 3B:
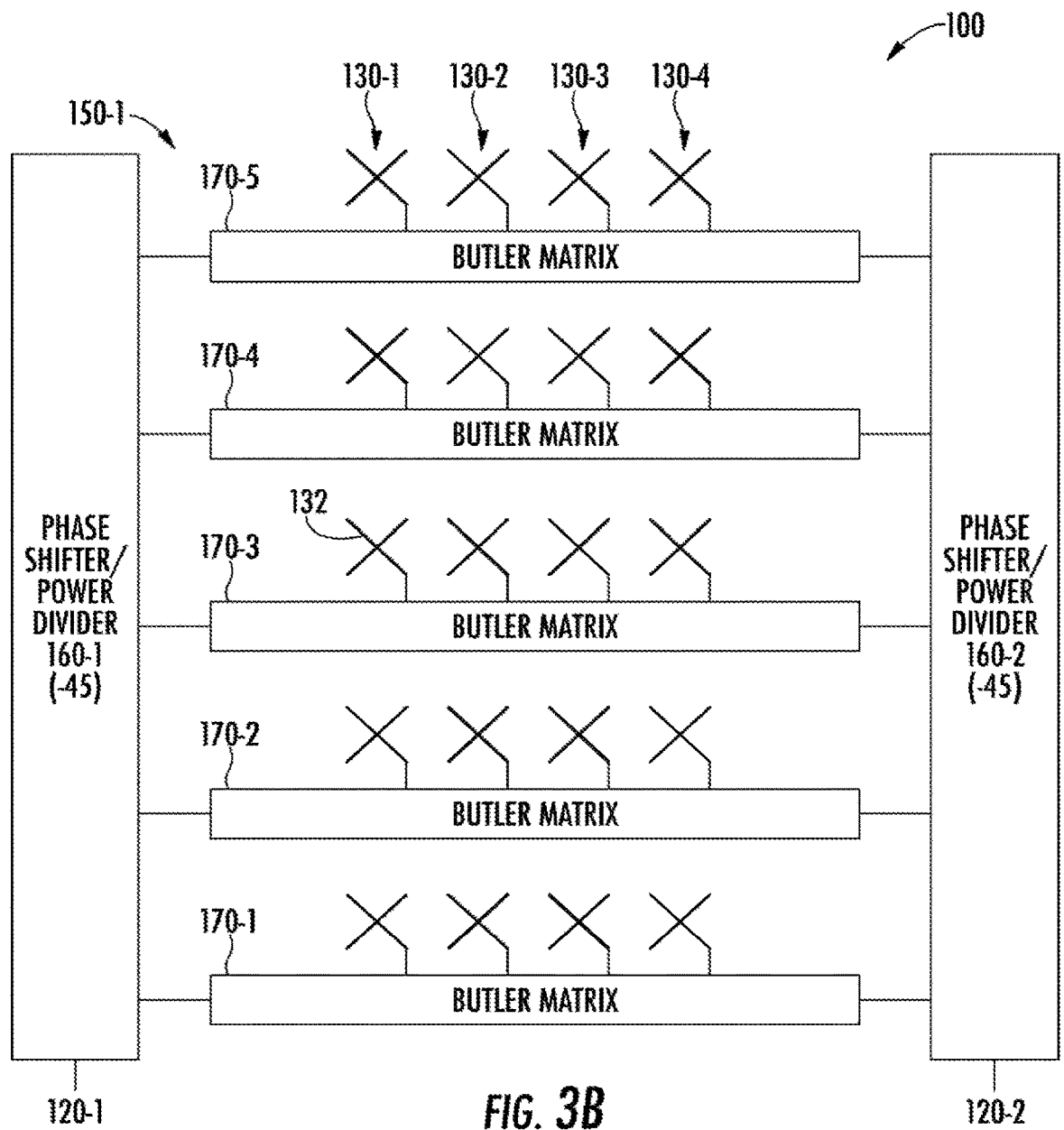
FIG. 3B is a schematic block diagram illustrating the columns of radiating elements and the feed network of the twin beam base station antenna of FIG. 3A.
Figure 3C:
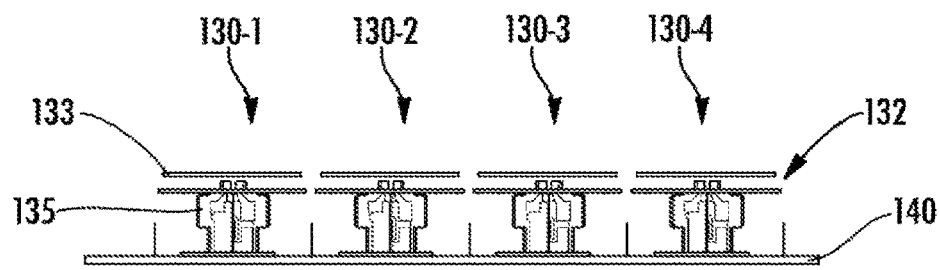
FIG. 3C is a cross-sectional view illustrating a row of radiating elements included in the twin beam base station antenna of FIGS. 3A-3B.
Figure 3D:
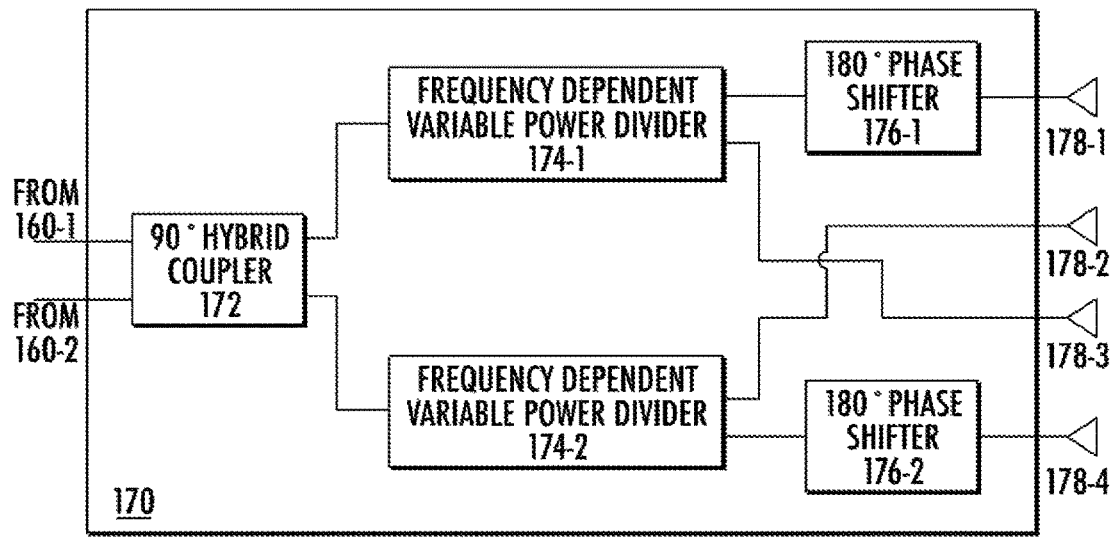
FIG. 3D is a block diagram of one of the beamforming networks shown in FIG. 3B.

Reference is now made to FIGS. 3A-3D, which illustrate a twin beam Butler Matrix style base station antenna 100 according to an example embodiment of the present invention that fully shares all of the columns of radiating elements in generating the two antenna beams. FIG. 3A is a perspective view of the twin beam base station antenna 100, while FIG. 3B is a block diagram of the base station antenna 100 that illustrates the feed network that is used to couple a pair of RF ports to the four columns of radiating elements included in the antenna 100. FIG. 3C is a transverse cross-sectional view of the twin beam base station antenna 100 that illustrates one of the rows of radiating elements included therein. FIG. 3D is a block diagram of one of the beamforming networks included in the twin beam base station antenna 100.

As shown in FIG. 3A, the twin beam Butler Matrix style base station antenna 100 includes a housing 110. In the depicted embodiment, the housing 110 is a multi-piece housing that includes a radome 112, a top end cap 114 and a bottom end cap 116. A plurality of RF ports 120 and control ports are mounted in the bottom end cap 116. The RF ports 120 may comprise RF connectors that may receive coaxial cables that provide RF connections between the base station antenna 100 and one or more radios (not shown).

The base station antenna 100 is an elongated structure that extends along a longitudinal axis $A_1$. The azimuth boresight pointing direction of the base station antenna 100 refers to a horizontal axis extending from the base station antenna 100 to the center, in the azimuth plane, of the 120° sector served by the base station antenna 100. When the base station antenna 100 is mounted for normal use, the longitudinal axis $A_1$ will typically extend along a vertical axis, although in some cases the base station antenna 100 may be tilted a few degrees from the vertical to impart a mechanical downtilt to the antenna beams formed by the base station antenna 100. As is further shown in FIG. 3A, the beamforming antenna 100 has a length, a depth and a width. The length L refers to the distance that the antenna 100 extends along the longitudinal axis $A_1$. The depth D refers to the distance that the antenna 100 extends along an axis $A_2$ that is perpendicular to the longitudinal dimension $A_1$ and that is collinear with the azimuth boresight pointing direction of the antenna 100. The width dimension W refers to the distance that the antenna 100 extends along an axis $A_3$ that is perpendicular to both axis $A_1$ and axis $A_2$.

Referring to FIGS. 3B and 3C, the base station antenna 100 further includes four columns 130-1 through 130-4 of radiating elements 132. Herein, when multiple of the same elements are included in an antenna, the elements may be referred to individually by their full reference numeral (e.g., column 130-3) and collectively by the first part of their reference numerals (e.g., the columns 130). Each column 130 includes a plurality of radiating elements 132. While the radiating elements 132 included in each column 130 are illustrated in FIGS. 3B and 3C as slant −45°/+45° cross-polarized dipole radiating elements 132 that have a dipole arm printed circuit board 133 that includes four dipole arms (not shown) that is mounted on a pair of feed stalk printed circuit boards 135, it will be appreciated that any appropriate radiating elements 132 may be used. For example, patch radiating elements may be used in other embodiments. The radiating elements 132 in each linear array 130 are mounted to extend forwardly from a backplane 140. The backplane 140 may comprise a metallic sheet that serves as a ground plane for the radiating elements 132 and that also serves as a reflector that redirects forwardly much of the backwardly-directed radiation emitted by the radiating elements 132. The backplane 140 may also include sidewalls (not shown) and may serve as a structural member of the antenna 100.

As is also shown in FIG. 3B, the antenna 100 includes a pair of feed networks 150-1, 150-2 that each include phase shifters/power dividers 160 and a plurality of beamforming networks 170. It will be appreciated that FIG. 3B only shows the feed network 150-1 for the −45° radiators of each cross-polarized dipole radiating element 132. The feed network 150-2 for the +45° radiators of each cross-polarized dipole radiating element 132 may be identical to feed network 150-1, except that feed network 150-2 extends between the +45° RF ports 120-3, 120-4 and the +45° radiators of each cross-polarized dipole radiating element 132.

As shown in FIG. 3B, an RF signal input at RF port 120-1 is passed to a first phase shifter/power divider 160-1. The first phase shifter/power divider 160-1 is configured to split an RF signal input thereto into five sub-components (which may have the same or, more typically, different power levels) and to inject a phase taper across the five sub-components of the RF signal in order to electrically change the elevation angle of the antenna beam formed by the RF signal input at RF port 120-1 in a desired fashion. Similarly, an RF signal input at RF port 120-2 is passed to a second phase shifter/power divider 160-2. The second phase shifter/power divider 160-2 is configured to split an RF signal input thereto into five sub-components (which may have the same or, more typically, different power levels) and to inject a phase taper across the five sub-components of the RF signal in order to electrically change the elevation angle of the antenna beam formed by the RF signal input at RF port 120-2 in a desired fashion. As the operation of phase shifter/power divider circuits is well understood in the art, further description thereof will be omitted here.

The five outputs of the first phase shifter/power divider 160-1 are coupled to respective first inputs of five Butler Matrix style beamforming networks 170-1 through 170-5, and the five outputs of the second phase shifter/power divider 160-2 are similarly coupled to respective second inputs of the five Butler Matrix style beamforming networks 170-1 through 170-5. Each Butler Matrix style beamforming network 170 includes four outputs, and each output is coupled to a respective one of the four radiating elements 132 in a row of radiating elements that are fed by the Butler Matrix style beamforming network 170 at issue.

FIG. 3D is a block diagram of one of the beamforming networks 170 shown in FIG. 3B. As shown in FIG. 3D, the outputs of the first and second phase shifters/power dividers 160-1, 160-2 are coupled to the two input ports of a 90° hybrid coupler 172. The two output ports of the 90° hybrid coupler 172 are coupled to inputs of respective first and second variable power dividers 174. The first and second variable power dividers 174 are frequency dependent power dividers, as will be discussed in greater detail below. The first output of the first variable power divider 174-1 is coupled to a first 180° phase shifter 176-1 (which may be implemented for example, as a delay line or by a 180° rotation of the dipole feed point), and the output of the first 180° phase shifter 176-1 is coupled to the first output 178-1 of the beamforming network 170. The second output of the first variable power divider 174-1 is coupled to the third output 178-3 of the beamforming network 170. Similarly, the first output of the second variable power divider 174-2 is coupled to a second 180° phase shifter 176-2 (which may be implemented for example, as a delay line or by a 180° rotation of the dipole feed point), and the output of the second 180° phase shifter 176-2 is coupled to the fourth output 178-4 of the beamforming network 170. The second output of the second variable power divider 174-2 is coupled to the second output 178-2 of the beamforming network 170.

Figure 4A:
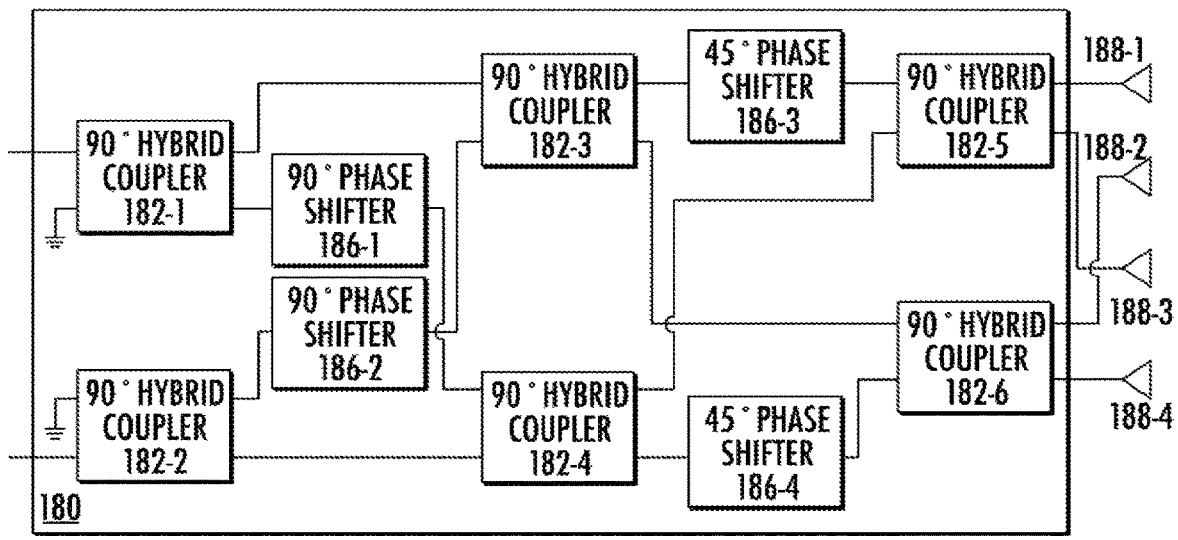
FIG. 4A is a block diagram of a conventional Butler Matrix style beamforming network.

The beamforming network 170 may be significantly simpler than a comparable conventional Butler Matrix beamforming network. FIG. 4A is a schematic block diagram of such a conventional Butler Matrix beamforming network 180. As shown in FIG. 4A, the first and second inputs to the conventional Butler Matrix beamforming network 180 are coupled to first input ports of respective first and second 90° hybrid couplers 182-1, 182-2. The second inputs of the first and second 90° hybrid couplers 182-1, 182-2 are coupled to ground. The first output of each of the first and second 90° hybrid couplers 182-1, 182-2 is coupled to respective first and second 90° phase shifters 186-1, 186-2, and the second output of each of the first and second 90° hybrid couplers 182-1, 182-2 is coupled to the first inputs of respective third and fourth 90° hybrid couplers 182-3, 182-4. The outputs of first and second 90° phase shifters 186-1, 186-2 are coupled to the second inputs of the respective third and fourth 90° hybrid couplers 182-3, 182-4. The first output of each of the third and fourth 90° hybrid coupler 182-3, 182-4 is coupled to a respective one of third and fourth 450 phase shifters 186-3, 186-4, and the second output of each of the third and fourth 90° hybrid couplers 182-3, 182-4 is coupled to the first inputs of respective fifth and sixth 90° hybrid couplers 182-5, 182-6. The outputs of the third and fourth 45° phase shifters 186-3, 186-4 are coupled to the second inputs of respective fifth and sixth 90° hybrid couplers 182-5, 182-6. The four outputs of the fifth and sixth 90° hybrid couplers 182-5, 182-6 are coupled to the respective four outputs 188-1 through 188-4 of the beamforming network 180.

As can be seen by comparing FIG. 3D and FIG. 4A, the beamforming network 170 is significantly simpler than the conventional beamforming network 180. In particular, the conventional beamforming network 180 incudes a total of six 90° hybrid couplers 182, whereas the beamforming network 170 includes only a single 90° hybrid coupler 172 and two frequency dependent variable power dividers 174. Additionally, the frequency dependent variable power dividers 174 decrease the variance in the azimuth HPBW as a function of frequency as compared to the conventional beamforming network 180. Thus, the beamforming base station antenna 100 may be simpler than a comparable conventional beamforming base station antenna and may also exhibit improved performance.

Figure 4B:
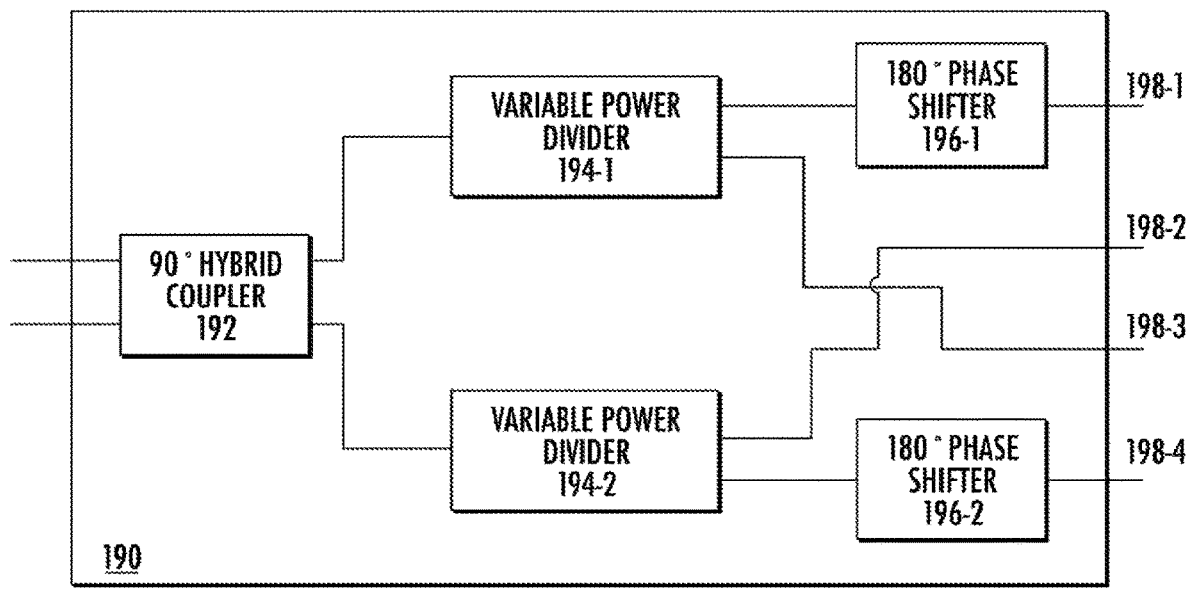
FIG. 4B is a block diagram of another conventional beamforming network.

FIG. 4B is a block diagram of another known beamforming network 190. As shown in FIG. 4B, the beamforming network 190 has first and second inputs that are coupled to the two input ports of a 90° hybrid coupler 192. The two output ports of the 90° hybrid coupler 192 are coupled to inputs of respective first and second variable power dividers 194-1, 194-2. The first output of the first variable power divider 194-1 is coupled to a first 180° phase shifter 196-1 and the output of the first 180° phase shifter 196-1 is coupled to the first output 198-1 of the beamforming network 190. The second output of the first variable power divider 194-1 is coupled to the third output 198-3 of the beamforming network 190. Similarly, the first output of the second variable power divider 194-2 is coupled to a second 180° phase shifter 196-2, and the output of the second 180° phase shifter 196-2 is coupled to the fourth output 198-4 of the beamforming network 190. Finally, the second output of the second variable power divider 194-2 is coupled to the second output 198-2 of the beamforming network 190.

Figure 5A:
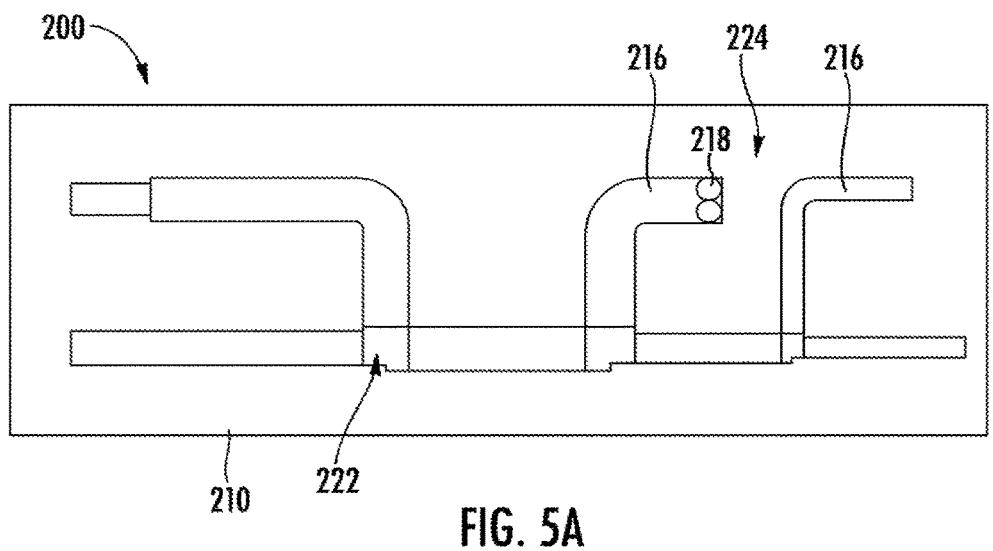
FIG. 5A is a plan view of a printed circuit board based frequency dependent variable power divider that may be used in implementing the beamforming network of FIG. 3D.

In some embodiments, the frequency dependent variable power dividers 174 may be implemented using the circuit shown in FIG. 5A, which depicts a printed circuit board based power divider 200 having a low pass filter at one output thereof. As shown in FIG. 5A, the power divider/low pass filter circuit 200 is implemented on a microstrip printed circuit board 210. The power divider/low pass filter circuit 200 includes a power divider 222 and a low pass filter 224. The microstrip printed circuit board 210 may include a dielectric substrate that has a ground plane metallization layer (not shown) covering a back side of the substrate and a metal "trace" pattern on the front side of the substrate. The traces of the trace pattern form microstrip transmission line segments and resonating stubs 216. The resonating stubs 216 form the low pass filter 224. A pair of plated through holes 218 are provided at the distal end of the central resonating stub 216 that connect to the ground layer of the microstrip printed circuit board 210.

Figure 5B:
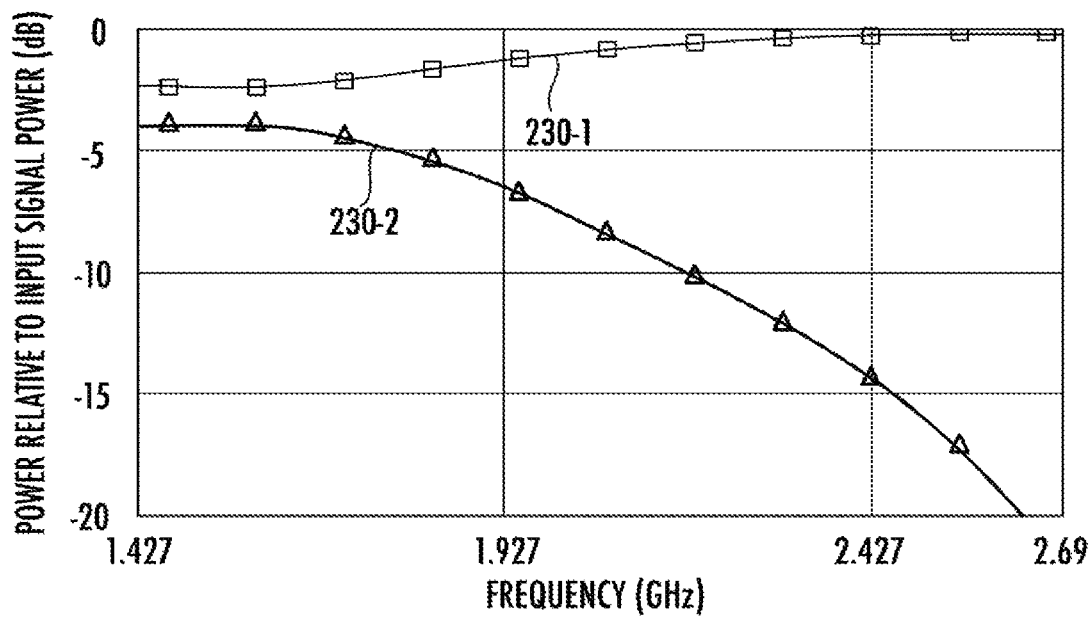
FIG. 5B is a graph showing the simulated response of the frequency dependent variable power divider circuit of FIG. 5A.

FIG. 5B is a graph showing the simulated response of the frequency dependent variable power divider circuit 200 of FIG. 5A. Curves 230-1 and 230-2 in FIG. 5B show the respective magnitudes of the signals output at the first and second output ports of frequency dependent variable power divider circuit 200 in response to an input RF signal, as a function of frequency. As shown in FIG. 5B, the relative magnitudes of the output signals vary as a function of frequency. The shapes of the curves 230-1, 230-2 in FIG. 5B may be changed by increasing or decreasing the number of resonating stubs 216 included in the low pass filter 224. If additional resonating stubs 216 are added, then the power at the output port that includes the low pass filter 224 decreases more quickly with increasing frequency, whereas if less resonating stubs 216 are included, then the power at that port decreases more slowly with increasing frequency.

Figure 5C:
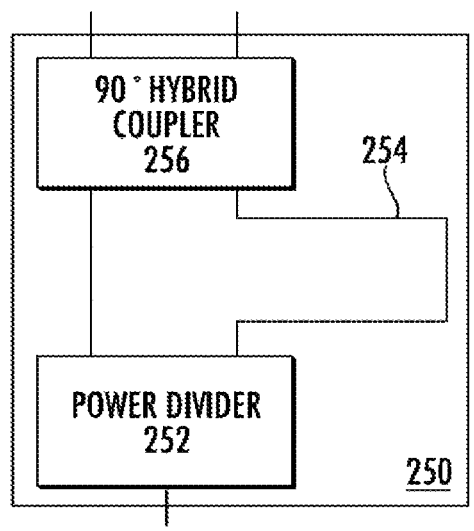
FIG. 5C is a block diagram of another frequency dependent variable power divider that may be used in implementing the beamforming network of FIG. 3D.

In other embodiments, the frequency dependent variable power dividers 174 may be implemented using the circuit 250 illustrated in FIG. 5C, which is disclosed in PCT Publication No. 2015/006676. As shown in FIG. 5C, the frequency dependent variable power divider 250 that is disclosed in PCT Publication No. 2015/006676 includes a first power divider 252, a delay line 254 and a 90° hybrid coupler 256. The power divider 252 splits an input signal into two sub-components. The power divider 252 may be an equal or unequal power divider. A first output of the power divider 252 is coupled to a first input of the 90° hybrid coupler 256. A second output of the power divider 252 is coupled to the delay line 254. The output of the delay line 254 is coupled to the second input of the 90° hybrid coupler 256.

The frequency dependent divider 250 may operate as follows. The delay line 254 imposes a phase delay to RF signals that are coupled to the second input of the 90° hybrid coupler 256. However, if the delay line 254 is a fixed length, the phase delay that will be experienced by an RF signal varies with the frequency of the RF signal input thereto. Thus, for a fixed length delay line 254, higher-frequency RF signals experience relatively more phase delay than do lower frequency RF signals. The 90° hybrid coupler 256, therefore, receives equal amplitude signals, where the signals to the second input thereof experience increasing phase delay with increasing frequency. The 90° hybrid coupler 256 outputs equal phase, variable amplitude signals, where the amount of the amplitude difference increases with increasing frequency. With proper selection of the length of the delay line 254, the azimuth HPBW can be stabilized over a desired frequency band, as is explained in further detail in PCT Publication No. 2015/006676, which is incorporated herein by reference.

Figure 6A:
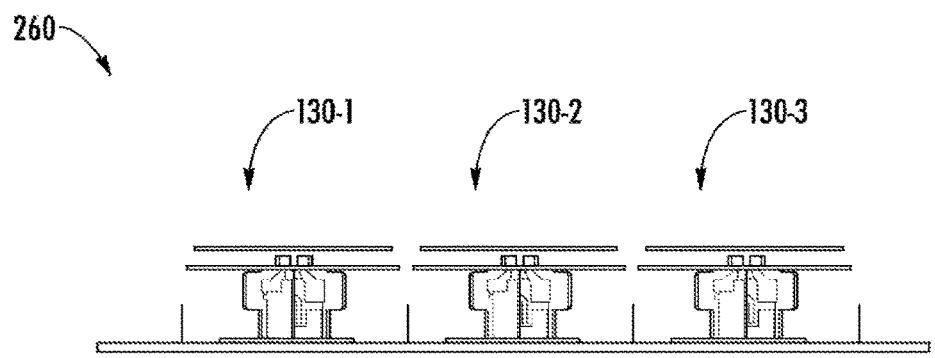
FIG. 6A is a transverse cross-sectional view of a base station antenna according to further embodiments of the present invention.
Figure 6B:
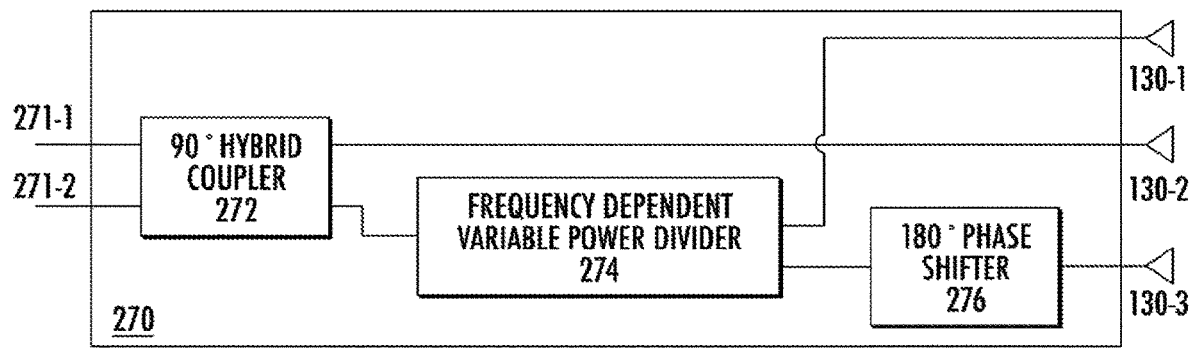
FIG. 6B is a block diagram of a beamforming network according to embodiments of the present invention that may be used in the base station antenna of FIG. 6A.

It should be noted that while the twin beam antenna 100 is illustrated as including four columns 130-1 through 130-4 of radiating elements 132, different numbers of columns may be included in other embodiments. For example, FIGS. 6A and 6B illustrate a base station antenna 260 according to a further embodiment of the present invention that includes three shared columns 130-1 through 130-3 of high-band radiating elements 132 that are used to form first and second antenna beams. FIG. 6A schematically illustrates one of the rows of high-band radiating elements 132 included in the base station antenna 260, while FIG. 6B illustrates a beamforming network 270 that may be used to connect first and second RF ports of the base station antenna 260 to at least one radiating element 132 in each column 130 of radiating elements 132.

As shown in FIG. 6B, the beamforming network 270 includes first and second inputs 271-1, 271-2 that may be coupled to first and second RF ports of the antenna 260. The inputs 271-1, 271-2 are coupled to the inputs of a 90° hybrid coupler 272. A first output of the 90° hybrid coupler 272 is coupled to one or more radiating elements in a second (middle) column 130-2 of high-band radiating elements, while the second output of the 90° hybrid coupler 272 is coupled to a frequency dependent variable power divider 274. The first output of the frequency dependent variable power divider 274 is coupled to one or more radiating elements in a first column 130-1 of high-band radiating elements, and the second output of the frequency dependent variable power divider 274 is coupled via a 180° phase shifter 276 to one or more radiating elements in a third column 130-3 of high-band radiating elements.

In still other embodiments (not depicted herein), the base station antenna could include five shared columns 130 of radiating elements 132, and the 2×4 beamforming networks (i.e., 2 inputs, 4 outputs) shown in FIG. 3B could be replaced with 2×5 beamforming networks.

Pursuant to further embodiments of the present invention, twin beam base station antennas are provided that use first and second multi-column arrays of radiating elements to form the twin beams. In some embodiments, the first and second multi-column arrays of radiating elements may be independent of each other, while in other embodiments the first and second multi-column arrays of radiating elements may share one or more columns of radiating elements. In some embodiments, the radiating elements in the first and second multi-column arrays may all "point" in the azimuth boresight pointing direction of the antenna (i.e., the radiating elements are positioned so that their peak radiation will be along the azimuth boresight pointing direction of the antenna), and electrical steering may be used to steer the first and second antenna beams in the azimuth plane. In other embodiments, mechanical steering may be used so that the radiating elements for the first multi-column array all have an azimuth pointing direction that corresponds to the peak gain of the first antenna beam in the azimuth plane, and the radiating elements for the second multi-column array similarly all have an azimuth pointing direction that corresponds to the peak gain of the second antenna beam in the azimuth plane. In still other embodiments, a combination of electrical and mechanical steering may be used. Example embodiments of twin beam base station antennas according to these aspects of the present invention are illustrated in FIGS. 7A-13. FIGS. 7A-7B, 8A-8D, 9A-9I, 10A-10B, 11A, 12A-12B and 13 are transverse cross-sectional diagrams illustrating the backplane for the antennas as well as one radiating element from each column of radiating elements. It will be appreciated, therefore, that each radiating element shown in these figures represents a linear array or "column" of radiating elements that extend into the page in the drawings.

Figure 7A:
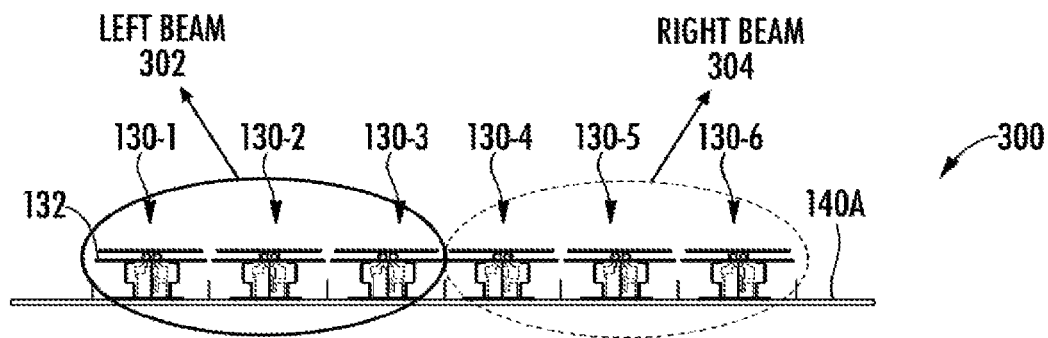
FIG. 7A is a transverse cross-sectional view of an electrically-steered twin beam base station antenna according to embodiments of the present invention.

A first purely electrically steered twin beam base station antenna 300 according to embodiments of the present invention is illustrated in FIG. 7A. As shown in FIG. 7A, the twin beam base station antenna 300 includes six columns 130-1 through 130-6 of high-band radiating elements 132 that are mounted to extend forwardly from a flat backplane 140A. The three left-most columns 130-1 through 130-3 of high-band radiating elements 132 are coupled to first and second RF ports (not shown) via a first common feed network (not shown) and are used to generate first antenna beams 302 (namely one for each of two polarizations) that have an azimuth pointing direction of about −30° (e.g., between −26° and −33°). The three right-most columns 130-4 through 130-6 of high-band radiating elements 132 are coupled to third and fourth RF ports (not shown) via a second common feed network (not shown) and are used to generate second antenna beams 304 (namely one for each of two polarizations) that have an azimuth pointing direction of about 30°. The first and second common feed networks each include frequency dependent variable power dividers that are used to scan the antenna beams 302, 304 in the azimuth plane.

Figure 7B:
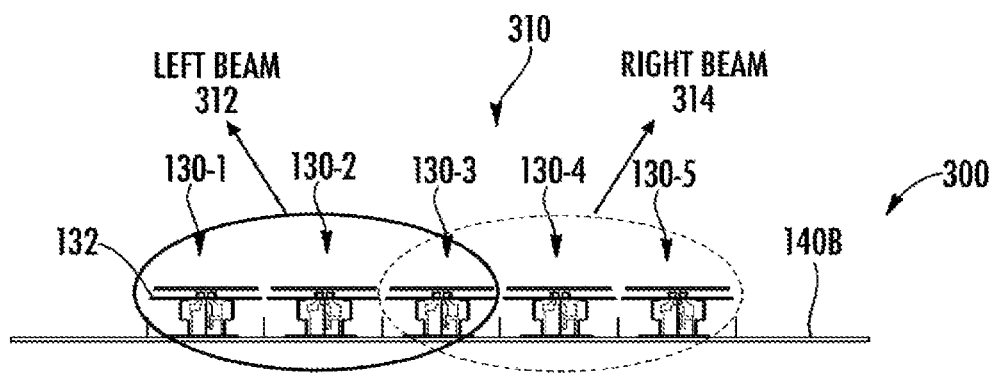
FIG. 7B is a transverse cross-sectional view of an electrically-steered twin beam base station antenna according to further embodiments of the present invention that includes a shared column of radiating elements.

FIG. 7B illustrates a twin beam base station antenna 310 according to embodiments of the present invention that is a modified version of the twin beam base station antenna 300 illustrated in FIG. 7A. The twin beam base station antenna 310 only has five columns 130-1 through 130-5 of high-band radiating elements 132 mounted on the backplane 140B, and the middle column 130-3 is connected to both feed networks. The sharing of the middle column 130-3 of radiating elements 132 results in power loss, degrading the performance of the antenna 310 as compared to the antenna 300, but eliminates one sixth of the radiating elements 132 and also results in an antenna that is perhaps 15% narrower in width. Columns 130-1 through 130-3 are coupled to first and second RF ports (not shown) and are used to generate first slant −45° and slant +45° polarization antenna beams 312 that have an azimuth pointing direction of about −30°, and columns 130-3 through 130-5 are coupled to third and fourth RF ports (not shown) and are used to generate second slant −45° and slant +45° polarization antenna beams 314 that have an azimuth pointing direction of about 30°.

A variety of different techniques may be used to share the radiating elements of column 130-3 so that the column is used in generating both antenna beam 312 and antenna beam 314. For example, U.S. patent application Ser. No. 16/287,114, filed Feb. 27, 2019 ("the '114 application"), discloses a variety of techniques for sharing a radiating element so that it is used in the generation of two different antenna beams. The entire contents of the '114 application is incorporated herein by reference.

As discussed above with reference to FIG. 2, twin beam antennas are known in the art that have multiple columns of radiating elements mounted on the two planar panels of a V-shaped backplane to generate respective first and second antenna beams that split a sector. The V-shaped backplane "mechanically" steers the antenna beams in that it points each radiating element at the azimuth angle corresponding to the antenna beams that the radiating element is used to generate. One disadvantage of the antenna of FIG. 2, however, is that the backplane does not include a suitable location for an array of low-band radiating elements, and hence the antenna of FIG. 2 is only suitable for use as a single band (high-band) antenna.

Pursuant to further embodiments of the present invention, twin beam, mechanically-steered base station antennas are provided that are configured as dual-band antennas. FIGS. 8A-8D illustrate four example embodiments of such antennas.

Figure 8A:
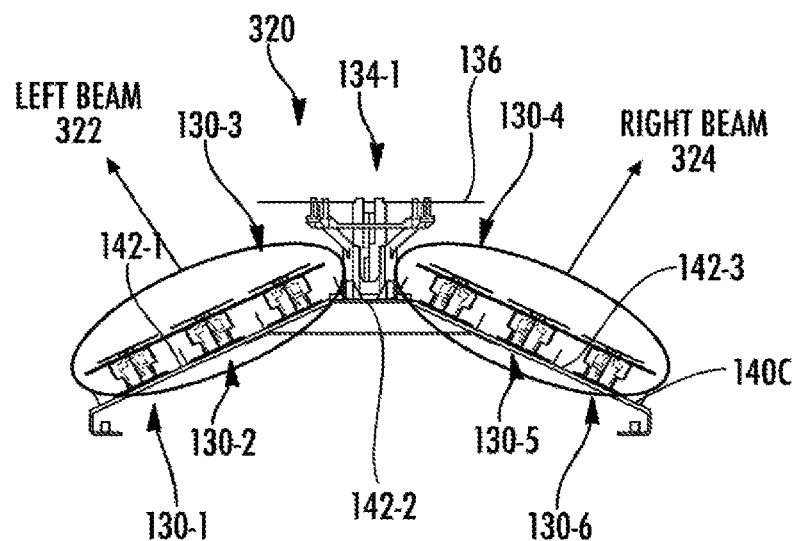
FIG. 8A is a transverse cross-sectional view of a mechanically-steered dual-band twin beam base station antenna according to embodiments of the present invention that further includes a single linear array of low-band radiating elements.

Referring first to FIG. 8A, a dual-band base station antenna 320 is depicted that includes six linear arrays 130-1 through 130-6 of high-band radiating elements 132 as well as a single linear array 134-1 of low-band radiating elements 136. The three left-most columns 130-1 through 130-3 of high-band radiating elements 132 are mounted to extend forwardly from a first face 142-1 of a generally V-shaped backplane 140C and are coupled to first and second RF ports (not shown) via a first common feed network (not shown) to generate first slant −45° and slant +45° polarization antenna beams 322 that have an azimuth pointing direction of about −30°. The three right-most columns 130-4 through 130-6 of high-band radiating elements 132 are mounted to extend forwardly from a third face 142-3 of the generally V-shaped backplane 140C and are coupled to third and fourth RF ports (not shown) via a second common feed network (not shown) to generate second slant −45° and slant +45° polarization antenna beams 324 that have an azimuth pointing direction of about 30°. As the first and third faces 142-1, 142-3 of the backplane 140C are perpendicular to the azimuth pointing direction of the respective first and second antenna beams 322, 324, no electrical steering of the radiation pattern is necessary. As is further shown in FIG. 8A, the backplane 140C is only generally V-shaped as the apex of the "V" is flattened to form a narrow second face 142-2. The linear array (column) 134 of low-band radiating elements 136 is mounted to extend forwardly from this second face 142-2. The linear array 134 of low-band radiating elements 136 may be a conventional linear array with an azimuth HPBW of about 65° so that the linear array 134 of low-band radiating elements 136 serves the entire sector (i.e., there is no sector-splitting in the low-band).

Figure 8B:
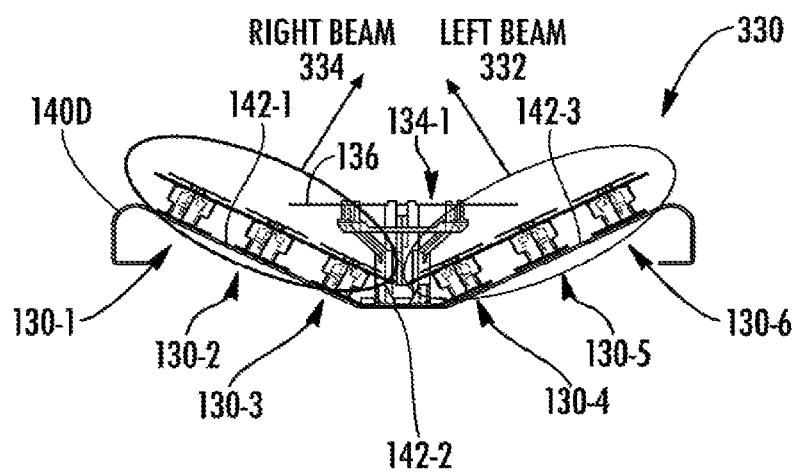
FIG. 8B is a transverse cross-sectional view of another mechanically-steered dual-band twin beam base station antenna according to an alternative embodiment of the present invention that also includes a single linear array of low-band radiating elements.

FIG. 8B illustrates a dual-band base station antenna 330 that is identical to the dual-band base station antenna 320 of FIG. 8A except that the generally V-shaped backplane 140C of base station antenna 320 is inverted (flipped) to provide a backplane 140D. As a result, the three left-most columns 130-1 through 130-3 of high-band radiating elements 132 are used to generate the antenna beam that points at an azimuth angle of about 30°, and the three right-most columns 130-4 through 130-6 of high-band radiating elements 132 are used to generate the antenna beam that points at an azimuth angle of about −30°. One potential advantage of the dual-band base station antenna 330 over the dual-band base station antenna 320 of FIG. 3A is that the linear array 134-1 of low-band radiating elements 136 is mounted relatively further rearwardly due to the inverted backplane 140D, which may reduce the overall depth of the antenna 330 as compared to the antenna 320.

Figure 8C:
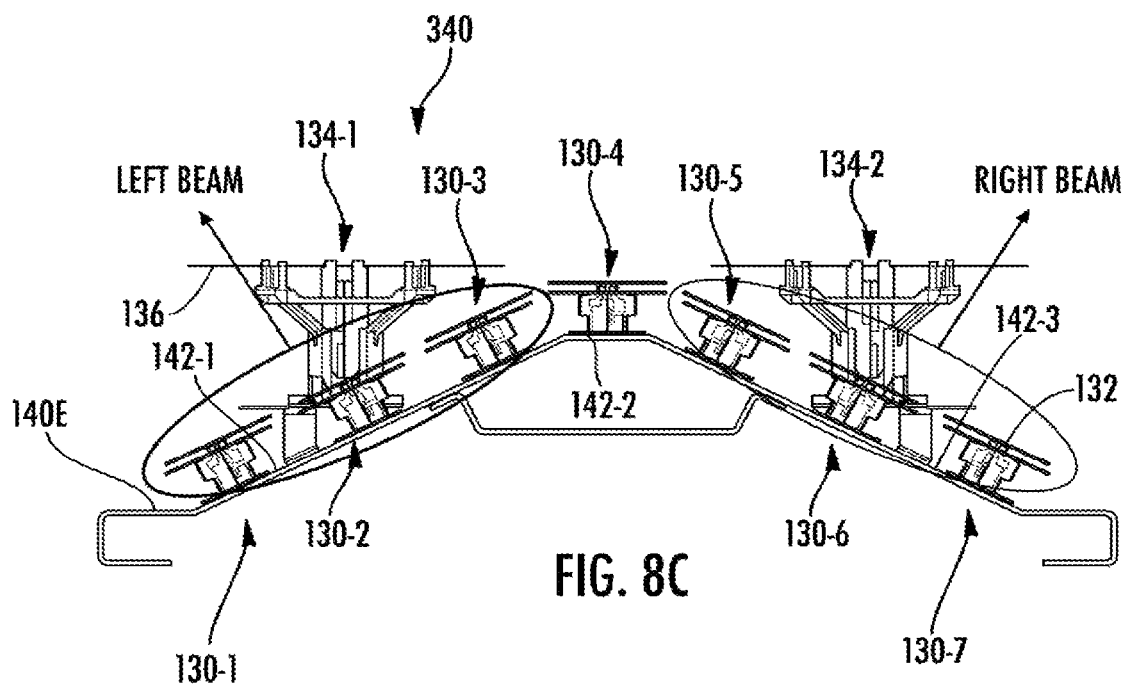
FIG. 8C is a transverse cross-sectional view of a mechanically-steered dual-band twin beam base station antenna according to embodiments of the present invention that also includes two linear arrays of low-band radiating elements.

FIG. 8C illustrates a dual-band base station antenna 340 that may be used, for example, to (1) support two different low-band services (e.g., 700 MHz and 800 MHz), (2) perform sector-splitting in the high-band, and (3) support service in another frequency band within the high-band frequency range. The base station antenna 340 include a total of seven linear arrays 130-1 through 130-7 of high-band radiating elements 132 and two linear arrays 134-1, 134-2 of low-band radiating elements 136. The three left-most columns 130-1 through 130-3 of high-band radiating elements 132 and the three right-most columns 130-5 through 130-7 of high-band radiating elements 132 may operate in the exact same manner as columns 130-1 through 130-3 and 130-4 through 130-6, respectively, of base station antenna 320, and hence further description thereof will be omitted. The backplane 140E may have a shape that is similar to the backplane 140C of antenna 320.

The antenna 340 further includes two linear arrays 134-1, 134-2 of low-band radiating elements 136. Low-band array 134-1 may be generally collinear with high-band array 130-2, and low-band array 134-2 may be generally collinear with high-band array 130-6, where the radiating elements of each pair of collinear arrays 134-1, 130-2; 134-2, 130-6 are interleaved along the vertical direction when the antenna 340 is mounted for use. The two low-band linear arrays 134-1, 134-2 may operate as sector (as opposed to sector-splitting) arrays that provide service in different frequency bands or that operate as a 4×MIMO antenna in the same frequency band. The linear array 130-4 of high-band radiating elements 132 may be used to support service in a different portion of the high-band. For example, the linear arrays 130-1 through 130-3 and 130-5 through 130-7 may comprise diplexed linear arrays that support service in two frequency bands in the 1695-2180 MHz frequency range, while the linear array 130-4 may be used to support service in the 2400-2690 MHz frequency band in an example embodiment.

Figure 8D:
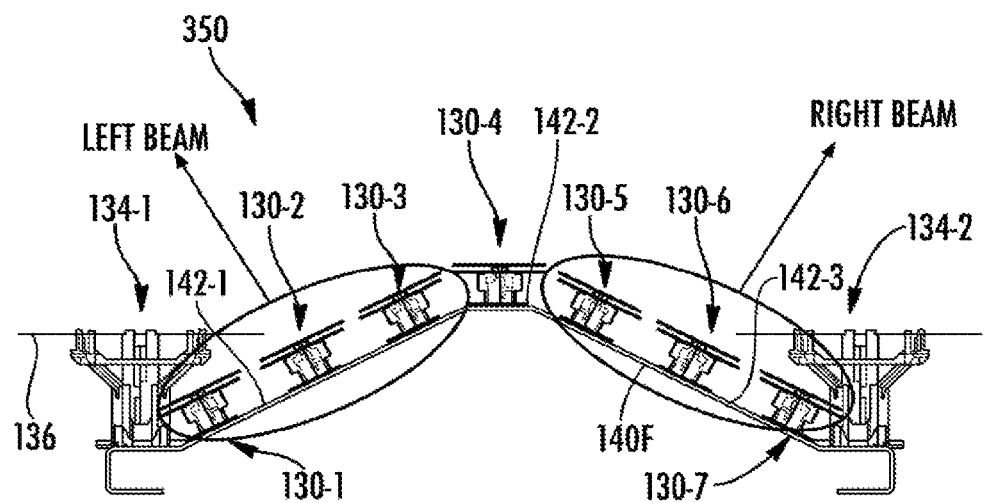
FIG. 8D is a transverse cross-sectional view of another mechanically-steered dual-band twin beam base station antenna according to an alternative embodiment of the present invention that includes two linear arrays of low-band radiating elements.

FIG. 8D illustrates a dual-band base station antenna 350 that is identical to the dual-band base station antenna 340 of FIG. 8C, except that the linear arrays 134-1, 134-2 of low-band radiating elements are moved to outside positions on each side of the antenna.

The base station antennas 300 and 310 of FIGS. 7A-7B include respective flat backplanes 140A, 140B that are perpendicular to the boresight pointing direction of the respective antennas, and electrically steer the sector-splitting antenna beams in the appropriate directions in the azimuth plane. In contrast, the base station antennas 320, 330, 340, 350 of FIGS. 8A-8D each instead use shaped backplanes to mechanically steer the sector-splitting antenna beams in the appropriate directions in the azimuth plane, thereby avoiding any need to electrically steer the antenna beams from boresight. Pursuant to still further embodiments of the present invention, dual-band, twin beam base station antennas are provided that use a combination of mechanical steering and electrical steering to potentially achieve improved performance. FIGS. 9A-9I are a series of transverse cross-sectional views of dual-band twin beam base station antenna according to embodiments of the present invention that include sector-splitting arrays that are both electrically and mechanically-steered.

Figure 9A:
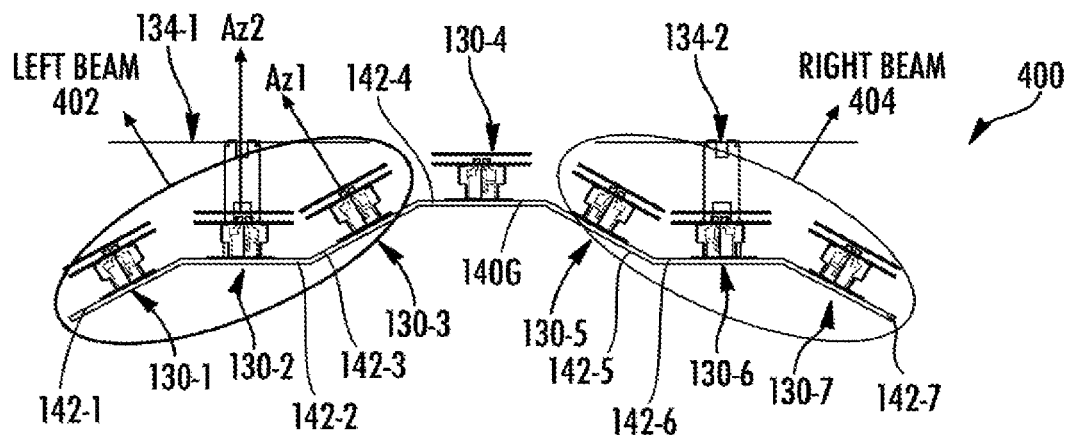
FIGS. 9A-9I are a series of transverse cross-sectional views of dual-band twin beam base station antennas according to embodiments of the present invention that include sector-splitting arrays that are both electrically-steered and mechanically-steered.

Referring to FIG. 9A, a dual-band base station antenna 400 is depicted that includes seven columns 130-1 through 130-7 of high-band radiating elements 132 as well as two columns 134-1, 134-2 of low-band radiating elements 136. All of the columns of radiating elements are mounted to extend forwardly from a shaped reflector 140G that includes a plurality of longitudinally-extending sections that are angled with respect to adjacent longitudinally-extending sections. One or more columns of radiating elements may be mounted to extend forwardly from each longitudinally-extending section of the reflector 140G. Some of the longitudinally extending sections are mounted to extend perpendicularly to an azimuth boresight pointing direction of the base station antenna 400, while others of the longitudinally-extending sections are angled with respect to the azimuth boresight pointing direction of the base station antenna 400 to mechanically steer the column(s) of radiating elements mounted thereon at least part of the way toward the desired azimuth pointing direction of the antenna beam formed by the column(s) of radiating elements.

In the embodiment of FIG. 9A, the reflector 140G includes first through seventh longitudinally-extending sections 142-1 through 142-7 that are arranged in numerical order across the width of the base station antenna 400. Longitudinally-extending sections 142-2, 142-4 and 142-6 extend perpendicularly to an azimuth boresight pointing direction of the base station antenna 400, while longitudinally-extending sections 142-1, 142-3, 142-5 and 142-7 are angled so that they do not extend perpendicularly to the azimuth boresight pointing direction of the base station antenna 400. Longitudinally-extending sections 142-1 and 142-3 are angled to the left in the azimuth plane from the azimuth boresight pointing direction of the base station antenna 400, while longitudinally-extending sections 142-5 and 142-7 are angled to the right in the azimuth plane from the azimuth boresight pointing direction of the base station antenna 400. In some embodiments, longitudinally-extending sections 142-1 and 142-3 are angled about −30° in the azimuth plane from the sections 142-2, 142-4, 142-6 that extend perpendicularly to the azimuth boresight pointing direction of the base station antenna 400 so that the first and third columns 130-1, 130-3 of high-band radiating elements 132 need not be electrically steered in the azimuth plane. Similarly, longitudinally-extending sections 142-5 and 142-7 are also angled about 30° in the azimuth plane from the sections 142-2, 142-4, 142-6 that extend perpendicularly to the azimuth boresight pointing direction of the base station antenna 400 so that the fifth and seventh columns 130-5, 130-7 of high-band radiating elements 132 need not be electrically steered in the azimuth plane.

The three left-most columns 130-1 through 130-3 of high-band radiating elements are coupled to first and second RF ports (not shown) via a first common feed network (not shown). The second column 130-2 of high-band radiating elements 132 may be electrically steered about −30° in the azimuth plane so that the boresight pointing direction for the radiation patterns emitted by each of the three left-most columns 130-1 through 130-3 of high-band radiating elements is at an azimuth angle of about −30° with respect to the azimuth boresight pointing direction of the base station antenna 400. Thus, the three left-most columns 130-1 through 130-3 of high-band radiating elements 132 will generate first slant −45° and slant +45° polarization antenna beams 402 that have an azimuth pointing direction of about −30°. The three right-most columns 130-5 through 130-7 of high-band radiating elements 132 are coupled to third and fourth RF ports (not shown) via a second common feed network (not shown). The sixth column 130-6 of high-band radiating elements 132 may be electrically steered about 30° in the azimuth plane so that the boresight pointing direction for the radiation patterns emitted by each of the three right-most columns 130-5 through 130-7 of high-band radiating elements is at an azimuth angle of about 30° with respect to the azimuth boresight pointing direction of the base station antenna 400. Thus, the three right-most columns 130-5 through 130-7 of high-band radiating elements will generate second slant −45° and slant +45° polarization antenna beams 404 that have an azimuth pointing direction of about 30°.

The linear array 130-4 of high-band radiating elements 132 may be used to support service in a different portion of the high-band. The azimuth half power beamwidth of the antenna beam formed by the fourth linear array 130-4 of high-band radiating elements 132 may be about twice the azimuth half power beamwidth of the antenna beam formed by the first through third linear arrays 130-1 through 130-3 of high-band radiating elements 132.

The antenna 400 further includes two linear arrays 134-1, 134-2 of low-band radiating elements 136. Low-band array 134-1 may be generally collinear with high-band array 130-2, and low-band array 134-2 may be generally collinear with high-band array 130-6, where the radiating elements of each pair of collinear arrays 134-1, 130-2; 134-2, 130-6 are interleaved along the vertical direction when the antenna 400 is mounted for use. The two low-band linear arrays 134-1, 134-2 may operate as sector (as opposed to sector-splitting) arrays that provide service in different frequency bands or that operate as a 4×MIMO antenna in the same frequency band.

Figure 9B:
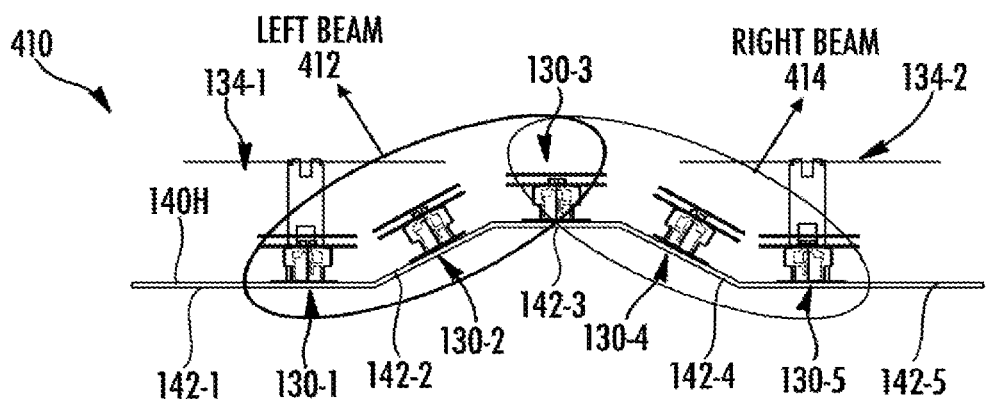

FIG. 9B depicts a dual-band base station antenna 410 that is a modified version of base station antenna 400 of FIG. 9A. Base station antenna 410, however, only includes five columns 130-1 through 130-5 of high-band radiating elements 132 as well as the two columns 134-1, 134-2 of low-band radiating elements 136. In the embodiment of FIG. 9B, the reflector 140H includes first through fifth longitudinally-extending sections 142-1 through 142-5 that are arranged in numerical order, with longitudinally-extending sections 142-1, 142-3 and 142-5 extending perpendicularly to an azimuth boresight pointing direction of the base station antenna 410, while longitudinally-extending section 142-2 is angled to the left in the azimuth plane (e.g., by about −30°) from the longitudinally-extending section 142-3, and longitudinally-extending section 142-4 is angled to the right in the azimuth plane (e.g., by about 30°) from the longitudinally-extending section 142-3. Thus, the second and fourth columns 130-2, 130-4 of high-band radiating elements 132 need not be electrically steered in the azimuth plane.

Columns 130-1 through 130-3 of high-band radiating elements are coupled to first and second RF ports via a first common feed network, with columns 130-1 and 130-3 of high-band radiating elements 132 electrically steered about −30° in the azimuth plane. Similarly, columns 130-3 through 130-5 of high-band radiating elements are coupled to third and fourth RF ports via a second common feed network, with columns 130-3 and 130-5 of high-band radiating elements 132 electrically steered about 30° in the azimuth plane. Column 130-3 of high-band radiating elements 132 is a shared column that is coupled to all of the first through fourth RF ports.

The antenna 410 again includes two columns 134-1, 134-2 of low-band radiating elements 136. As the columns 134-1, 134-2 of low-band radiating elements 136 have already been described above with reference to FIG. 9A, further description thereof will be omitted.

Figure 9C:
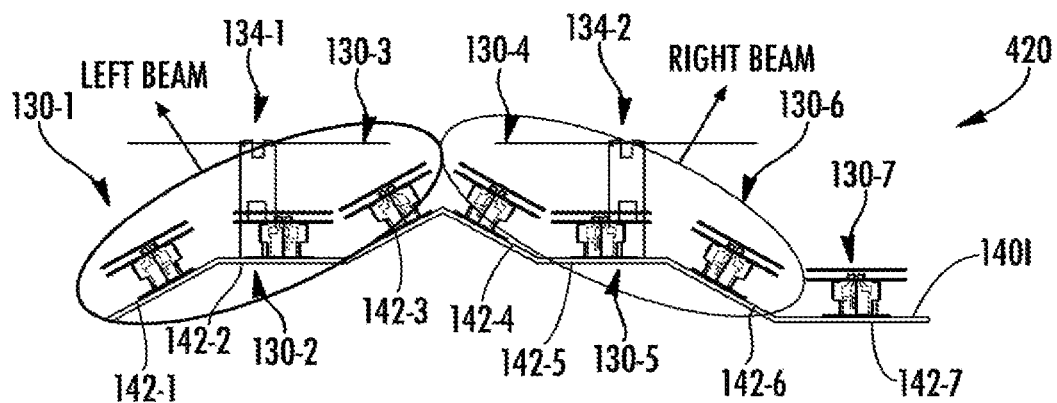

FIG. 9C depicts a dual-band base station antenna 420 that is another modified version of base station antenna 400 of FIG. 9A. Base station antenna 420 is identical to base station antenna 400 except that the reflector 140I of base station antenna 420 is shaped differently than the reflector 140G of base station antenna 400. In particular, in base station antenna 420, the longitudinally-extending section of the reflector 140I that includes the column of high-band radiating elements 132 that generates an antenna beam that provides coverage to the full sector is moved to an outside edge of the antenna (here it is longitudinally extending section 142-7) instead of being positioned in the middle of the antenna as is the case in base station antenna 400. Additionally, in the antenna of FIG. 9C, the two columns 134-1, 134-2 of low-band radiating elements 136 are not quite collinear with columns 130-2, 130-5 of high-band radiating elements 132 in order to maintain proper spacing between the two low-band columns 134-1, 134-2 of radiating elements 136 for isolation purposes.

Figure 9D:
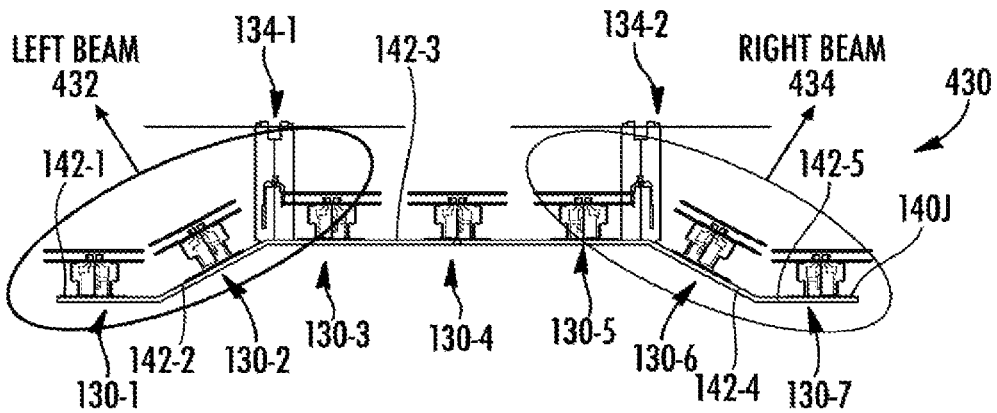

FIG. 9D depicts a dual-band base station antenna 430 that is another modified version of base station antenna 400 of FIG. 9A. Base station antenna 430 is identical to base station antenna 400 except that the reflector 140J of base station antenna 430 is again shaped differently than the reflector 140G of base station antenna 400. In particular, the reflector 140J of base station antenna 430 only includes five longitudinally-extending sections 142-1 through 142-5, and only longitudinally-extending sections 142-2 and 142-4 are angled such that they are not perpendicular to the azimuth boresight pointing direction of antenna 430. Additionally, longitudinally-extending section 142-3 is widened and has three columns 130-3 through 130-5 of high-band radiating elements 132 and both columns 134-1, 134-2 of low-band radiating elements 136 mounted thereon. Thus, base station antenna 430 only mechanically steers two columns 130-2, 130-6 of high-band radiating elements 132 and electrically steers four columns 130-1, 130-3, 130-5, 130-7 of high-band radiating elements 132 to generate the twin antenna beams 432, 434 that split the sector, whereas base station antenna 400 mechanically steers four columns 130-1, 130-3, 130-4, 130-7 of high-band radiating elements 132 and only electrically steers two 130-2, 130-6 columns of high-band radiating elements 132 to generate the twin antenna beams that split the sector. Generally speaking, base station antenna 400 would be expected to provide better performance than base station antenna 430, but base station antenna 400 also may have a larger footprint in the depth direction.

Figure 9E:
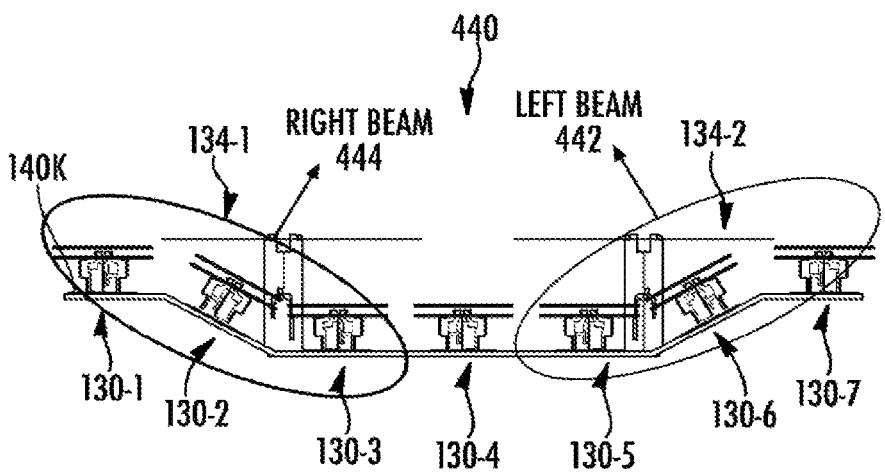

FIG. 9E depicts a dual-band base station antenna 440 that is a modified version of base station antenna 430 of FIG. 9D. Base station antenna 440 is identical to base station antenna 430 except that the reflector 140J of base station antenna 430 is inverted (as was the case for base station antenna 330 of FIG. 8B, discussed above) to provide a reflector 140K so that the three columns 130-1 through 130-3 of high-band radiating elements 132 on the left side of antenna 440 are used to form the antenna beam 444 that covers the right side of the sector and the three columns 130-5 through 130-7 of high-band radiating elements 132 on the right side of antenna 440 are used to form the antenna beam 442 that covers the left side of the sector.

Figure 9F:
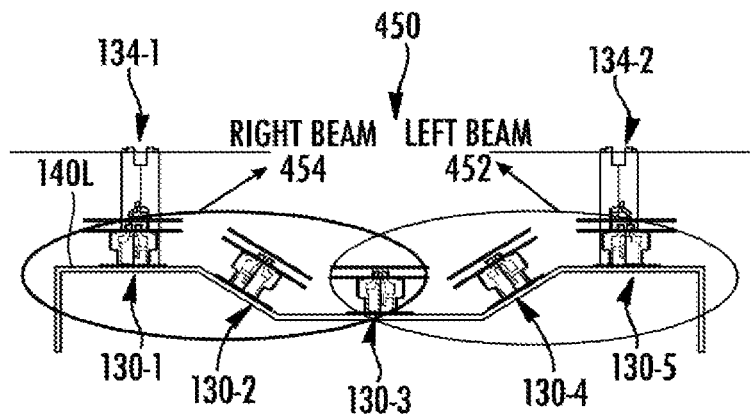

FIG. 9F depicts a dual-band base station antenna 450 that is a modified version of base station antenna 410 of FIG. 9B.

In particular, base station antenna 450 is identical to base station antenna 410 except that the reflector 140L of base station antenna 450 is inverted so that the three columns 130-1 through 130-3 of high-band radiating elements 132 on the left side of antenna 450 are used to form the antenna beam 454 that covers the right side of the sector and the three columns 130-3 through 130-5 of high-band radiating elements 132 on the right side of antenna 450 are used to form the antenna beam 452 that covers the left side of the sector. Column 130-3 of high-band radiating elements 132 is a shared column of radiating elements that is coupled to all of the first through fourth RF ports (not shown).

Figure 9G:
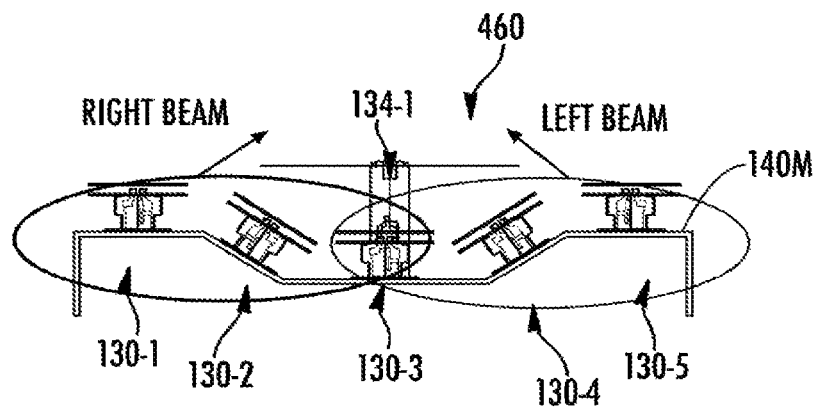

FIG. 9G depicts a dual-band base station antenna 460 that is a modified version of base station antenna 450 of FIG. 9F. In particular, base station antenna 460 only includes a single column 134-1 of low-band radiating elements 136 that is mounted on the middle longitudinally-extending section 142-3 of a reflector 140M. Base station antenna 460 thus can only support service in a single frequency band in the low-band. Base station antenna 460, however, may be thinner in the depth direction than base station antenna 450 as the column 134-1 of low-band radiating elements 136 is mounted on a more rearwardly positioned section of the reflector.

Figure 9H:
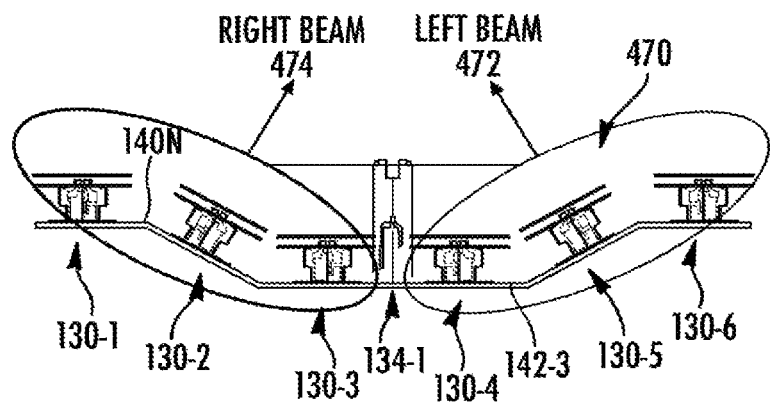

FIG. 9H depicts a dual-band base station antenna 470 that is a modified version of base station antenna 460 of FIG. 9G. In particular, base station antenna 470 includes a sixth column 130-6 of high-band radiating elements 132 by mounting two columns 130-3, 130-4 of high-band radiating elements 132 on the third longitudinally extending section 142-3 of the reflector 140N. As a result, the base station antenna 470 does not need to share a column 130 of high-band radiating elements 132 and instead uses columns 130-1 through 130-3 to form the first sector-splitting high-band antenna beam 474 and columns 130-4 through 130-6 to form the second sector-splitting high-band antenna beam 472.

Figure 9I:
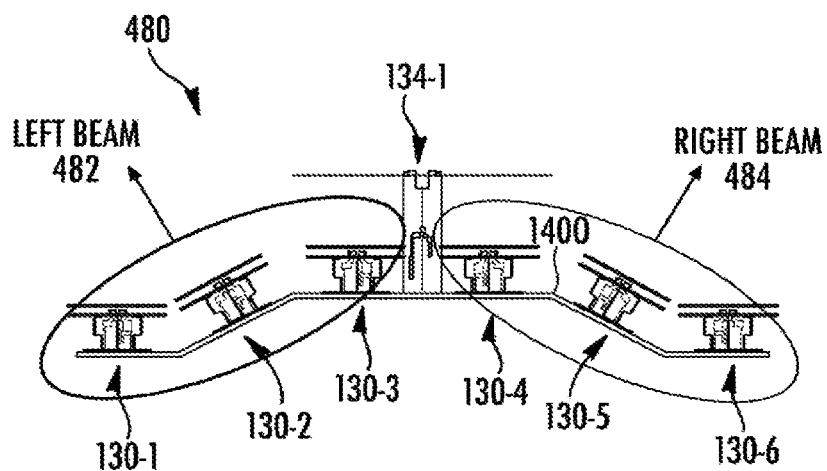

FIG. 9I depicts a dual-band base station antenna 480 that is a modified version of base station antenna 470 of FIG. 9H. In particular, base station antenna 480 is identical to base station antenna 470 except that the reflector 140O of base station antenna 480 is not inverted as was the case with the reflector 140N of base station antenna 470. Thus, in base station antenna 480, the three left-most columns 130-1 through 130-3 of high-band radiating elements 132 form the antenna beam 482 that covers the left side of the sector and the three right-most columns 130-4 through 130-6 of high-band radiating elements 132 form the antenna beam 484 that covers the right side of the sector.

Thus, FIGS. 9A-9I illustrate twin beam base station antennas that are configured to split a sector of a three-sector base station into first and second sub-sectors. These antennas each include a first array that includes a plurality of columns of first frequency band radiating elements, the first array configured to form a first antenna beam that provides coverage throughout the first sub-sector. These antennas may also include a second array that includes a plurality of columns of first frequency band radiating elements, the second array configured to form a second antenna beam that provides coverage throughout the second sub-sector. As an example, in the base station antenna 400 of FIG. 9A, the first array comprises columns 130-1 through 130-3 that are used to generate the "left" antenna beam 402 and the second array comprises columns 130-4 through 130-6 that are used to generate the "right" antenna beam 404. As another example, in the base station antenna 410 of FIG. 9B, the first array comprises columns 130-1 through 130-3 that are used to generate the "left" antenna beam 412 and the second array comprises columns 130-3 through 130-5 that are used to generate the "right" antenna beam 414. A peak gain of the first antenna beam (e.g., antenna beam 402 in FIG. 9A) may occur at an azimuth angle that is offset by at least 30° from an azimuth angle where a peak gain of the second antenna beam (e.g., antenna beam 404 in FIG. 9A) occurs.

The radiating elements in a first of the columns in the first array have a first azimuth boresight pointing direction and the radiating elements in a second of the columns in the first array have a second azimuth boresight pointing direction that is offset from the first azimuth boresight pointing direction by at least 10°. Moreover, the radiating elements in the second of the columns in the first array are electrically steered. For example, as shown in FIG. 9A, the radiating elements in column 130-3 have a first azimuth boresight pointing direction as shown by arrow Az1 and the radiating elements in column 130-2 have a second azimuth boresight pointing direction as shown by arrow Az2. The first and second azimuth boresight pointing directions Az1 and Az2 differ by about 30°. Additionally, the radiating elements in column 130-2 are electrically steered.

The columns of radiating elements in the first and second arrays may be mounted on a backplane that includes a reflector that has a plurality of longitudinally-extending sections. Some of these sections, such as sections 142-2, 142-4 and 142-6 in base station antenna 400 of FIG. 9A, may be perpendicular to an azimuth boresight pointing direction of the twin beam base station antenna. Other of the columns in the first and second arrays may be on sections of the reflector that are angled in the azimuth plane with respect to the sections that are perpendicular to the azimuth boresight pointing direction of the antenna, such as sections 142-1, 142-3, 142-5 and 142-7 in base station antenna 400 of FIG. 9A. In some embodiments, these sections may be angled at least 15° from the sections that are perpendicular to the azimuth boresight pointing direction of the antenna.

The base station antennas may also include one or more columns of second frequency band radiating elements. Typically, the first frequency band radiating elements may comprise "high-band" radiating elements that operate, for example, in all or a portion of the 1.7-2.7 GHz frequency band (or higher frequency bands) and the second frequency band radiating elements may comprise low-band radiating elements that operate in all or a portion of the 617-960 MHz frequency band. Embodiments of the present invention, however, are not limited thereto. In embodiments where the second frequency band radiating elements are low-band radiating elements, it may be advantageous to mount these radiating elements on portions of the reflector that are more rearwardly located than other portions of the reflector in order to reduce the overall depth of the antenna.

FIGS. 9A-9I also illustrate twin beam base station antennas that include a first RF port, a first array that includes first and second columns of radiating elements that are both coupled to the first RF port, and a backplane that includes a reflector, the reflector having a first longitudinally extending section that is perpendicular to the azimuth boresight pointing direction of the base station antenna and a second longitudinally extending section that is angled in the azimuth plane by at least 15° from the first longitudinally extending section of the reflector. The radiating elements in the first column are mounted to extend forwardly from the first longitudinally extending section of the reflector, and the radiating elements of the second column are mounted to extend forwardly from the second longitudinally extending section of the reflector. The first and second columns of radiating elements are configured to generate respective first and second radiation patterns that have pointing directions that are within about 10° of each other in the azimuth plane. With reference to base station antenna 400 of FIG. 9A, the first column of radiating elements may be column 130-2 and the second column of radiating elements may be column 130-1 (or column 130-3). Typically, columns 130-1 through 130-3 will each generate respective radiation patterns that point in the same direction in the azimuth plane, although some variation (although less than 10° variation) may be desired in some cases.

The base station antennas of FIGS. 9A-9I also each have a reflector that includes at least first through fifth longitudinally-extending sections and first through fifth columns of first frequency band radiating elements, the first through fifth columns of first frequency band radiating elements mounted to extend forwardly from the respective first through fifth longitudinally-extending sections of the reflector. Each of the first through fifth longitudinally-extending section of the reflector directly connect to one or two other of the first through fifth longitudinally-extending sections of the reflector at angles of at least 5° in the azimuth plane. Additionally, each of the first through fifth longitudinally-extending sections of the reflector defines a respective plane, and axes that are perpendicular to each respective plane are each angled less than 45° in an azimuth plane with respect to a boresight pointing direction of the base station antenna.

Figure 10A:
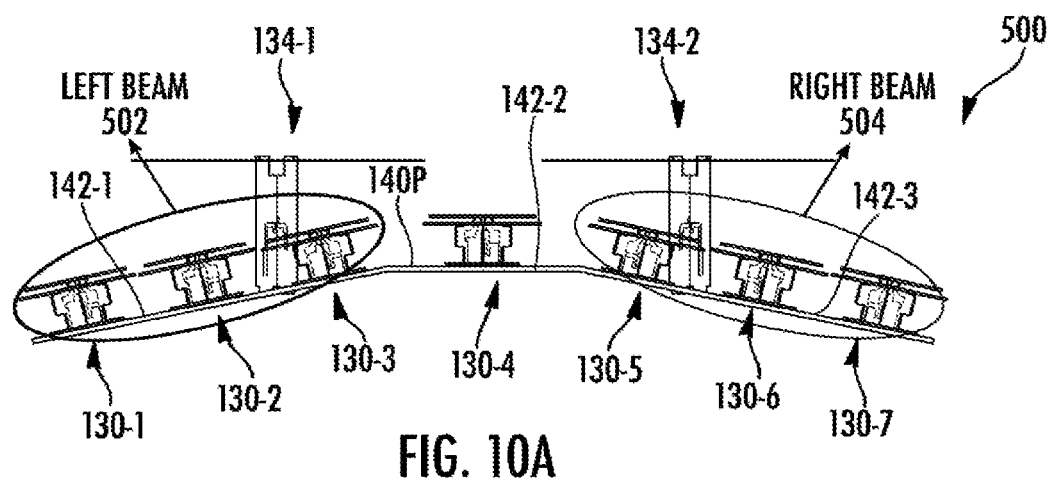
FIGS. 10A-10B are transverse cross-sectional views of dual-band twin beam base station antennas according to further embodiments of the present invention that include columns of radiating elements that are both electrically and mechanically-steered.
Figure 10B:
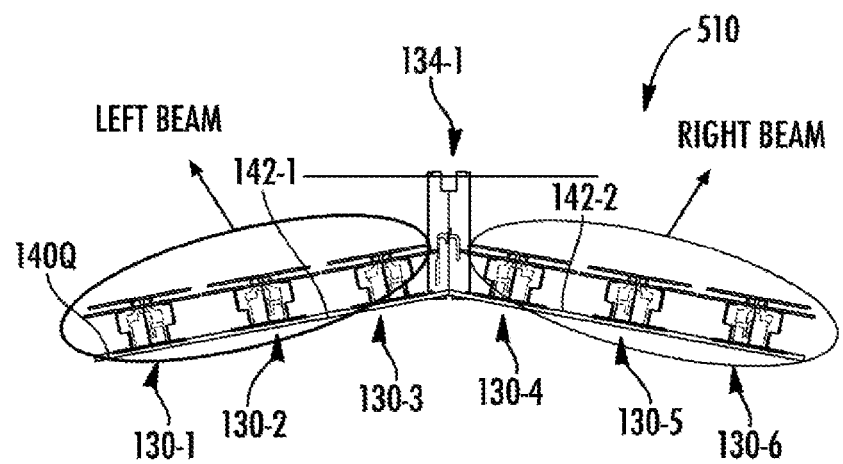

Pursuant to still further embodiments of the present invention, twin beam sector splitting base station antennas are provided that use a combination of mechanical steering and electrical steering to create the twin beams, but less than full mechanical steering is used. In other words, the reflector may be shaped to partially mechanically steer some or all of the columns of radiating elements in the azimuth direction toward the middle of a sub-sector, and electrical steering may be used to steer the antenna beam the remainder of the way in the azimuth plane. This approach may advantageously allow all of the columns 130 of high-band radiating elements 132 to be mechanically steered without significantly increasing the depth of the antenna. Moreover, while all of the columns 130 of high-band radiating elements may also need to be electrically steered, the amount of electrical steering may be significantly reduced (e.g., to less than 20° in example embodiments). As the most significant distortions in the antenna beams tend to occur when large amounts of electrical steering are applied, the approach of both mechanically and electrically steering some or all of the columns 130 of high-band radiating elements 132 may provide excellent performance without significantly increasing the size of the base station antenna in the depth direction. FIGS. 10A and 10B illustrate two example embodiments of base station antennas according to embodiments of the present invention that have both mechanically and electrically steered columns of high-band radiating elements.

As shown in FIG. 10A, a base station antenna 500 includes seven columns 130-1 through 130-7 of high-band radiating elements 132 as well as two columns 134-1, 134-2 of low-band radiating elements 136. All of the columns of radiating elements are mounted to extend forwardly from a shaped reflector 140P that includes three longitudinally-extending sections. The middle longitudinally-extending section 142-2 extends perpendicularly to an azimuth boresight pointing direction of the base station antenna 500. The longitudinally-extending sections 142-1, 142-3 on either side of the middle longitudinally-extending section 142-2 each extend rearwardly from longitudinally-extending section 142-2 at an angle that is significantly less than 30° (i.e., by an angle that is less than the angle required to mechanically steer the columns of radiating elements 130 that are mounted on longitudinally-extending sections 142-1, 142-3 so that electrical steering is not required). In the depicted embodiment, each longitudinally-extending section 142-1, 142-3 extends rearwardly at an angle of about 12.5°, although any appropriate angle may be used. Angles between about 5° and about 20° may be preferred in some applications.

Since each column 130-1 through 130-3 of high-band radiating elements 132 that is used to form the antenna beam 502 covering the left half of the sector is only mechanically steered by 12.5°, these columns are electrically steered in the azimuth plane by, for example, about 15.5°-17.5° in order to have a total scan in the azimuth plane of about 27°-30°. Notably, all three columns 130-1 through 130-3 of high-band radiating elements 132 that are used to form the antenna beam 502 covering the left half of the sector are mounted on the same longitudinally-extending section 142-1 of the reflector 140P. Antenna columns 130-5 through 130-7 on the right side of the antenna 500 have a mirror image design and operate in the same fashion to form a second sector-splitting high-band antenna beam 504, and hence further description thereof will be omitted. The linear array 130-4 of high-band radiating elements 132 may be used to support service in a different portion of the high-band, as discussed above, for example, with respect to base station antenna 400 of FIG. 9A.

Base station antenna 500 further includes first and second columns 134-1, 134-2 of low-band radiating elements 136. One potential complication in the design of base station antenna 500 is that the low-band columns 134-1, 134-2 are mounted to extend forwardly from angled sections 142-1, 142-3 of the reflector 140P, and hence the feed stalks of the low-band radiating elements 136 will not be perpendicular to the underlying sections of the reflector 140P from which they extend. Plastic clips may be used to support the low-band radiating elements 136 so that they extend forwardly from the reflector 140P at the correct angle (which here would be at angles of about 77.5° in light of the 12.5° angling of the reflector 140P.

FIG. 10B depicts a dual-band base station antenna 510 that is a modified version of base station antenna 500 of FIG. 10A. Base station antenna 510 differs from base station antenna 500 in that (1) the middle longitudinally-extending section 142-2 of reflector 140P is omitted, (2) antenna 510 only includes a single column 134-1 of low-band radiating elements 136 that is mounted in the middle of the antenna, and (3) antenna 510 does not include the extra column 130 of high-band radiating elements 132 that is used in antenna 500 to form a sector antenna beam in a different portion of the high-band frequency range. The primary advantage of base station antenna 510 over base station antenna 500 is that it has a reduced width, although it supports service in less frequency bands.

Figure 11A:
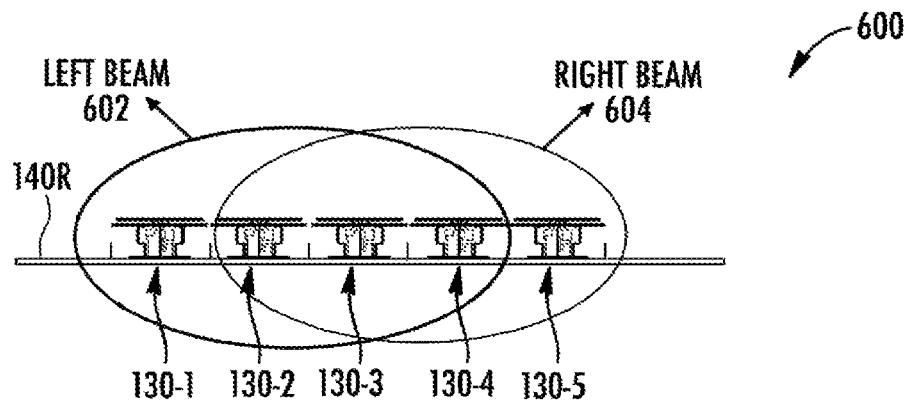
FIG. 11A is a transverse cross-sectional view of a twin beam base station antenna according to embodiments of the present invention that uses a Butler Matrix style beamforming network on only some of the columns of radiating elements that are used to generate the twin beams.
Figure 11B:
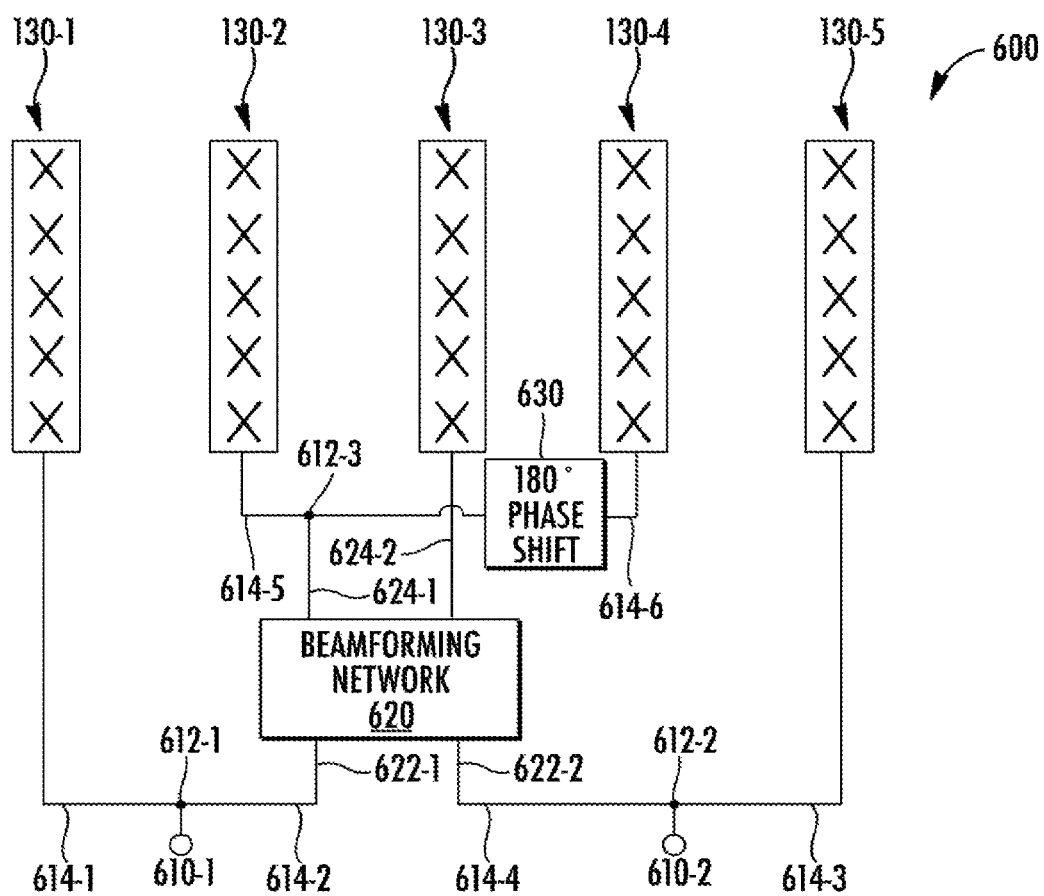
FIG. 11B is a block diagram of the base station antenna of FIG. 11A.

Pursuant to still further embodiments of the present invention, twin beam base station antennas are provided that use a beamforming network with some, but not all, of the columns of radiating elements that are used to form the two sector-splitting antenna beams. It has been found that including one or more additional columns of radiating elements that are not connected to the beamforming network may improve the overall performance of the antenna for some applications. FIGS. 11A and 11B schematically illustrate a base station antenna 600 that has such a design.

As shown in FIG. 11A, the base station antenna 600 includes five columns of high-band radiating elements 132 that are mounted on a flat reflector 140R. Columns 130-1 through 130-4 may be used to generate a first sector-splitting antenna beam 602, while columns 130-2 through 130-5 may be used to generate a second sector-splitting antenna beam 604. FIG. 11B schematically illustrates the feed network for one of the two polarizations supported by base station antenna 600. As shown in FIG. 11B, the antenna 600 includes a first RF port 610-1 and a second RF port 610-2. RF port 610-1 is coupled to a first power divider 612-1, and RF port 610-2 is coupled to a second power divider 612-2. The power dividers 612-1, 612-2 may be unequal power dividers in some embodiments. For example, the power dividers 612 may provide more power to their outputs 614-2, 614-4 (that feed columns 130-2 through 130-4) than to their outputs 614-1, 614-3 (that feed columns 130-1 and 130-5, respectively).

Output 614-2 of power divider 612-1 and output 614-4 of power divider 612-2 are coupled to the respective inputs 622-1, 622-2 of a beamforming network 620. The beamforming network 620 may comprise, for example, a 90° hybrid coupler in some embodiments. The first output 624-1 of beamforming network 620 is coupled to a power divider 612-3. The first output 614-5 of power divider 612-3 is coupled to column 130-2 of high-band radiating elements 132, and the second output 614-6 of power divider 612-3 is coupled to column 130-4 of high-band radiating elements 132 through a 180° phase shifter 630. The second output 624-2 of beamforming network 620 is coupled to column 130-3 of high-band radiating elements 132. The first output 614-1 of power divider 612-1 is coupled to column 130-1 of high-band radiating elements 132, and the first output 614-3 of power divider 612-2 is coupled to column 130-5 of high-band radiating elements 132. The power and phase of the sub-component of an RF signal input at RF port 610-1 that is passed to column 130-1 may be adjusted to shape the first antenna beam independently of the second antenna beam, while the power and phase of the sub-component of an RF signal input at RF port 610-2 that is passed to column 130-5 may be adjusted to shape the second antenna beam 604 independently of the first antenna beam 602. This can provide improved performance in terms of azimuth beamwidth, azimuth pointing angle and azimuth sidelobes. While not shown in FIG. 11B, a phase shifter/power divider may be coupled between the beamforming network 620 and each column 130 of radiating elements 132. Each phase shifter/power divider splits the RF signal that is fed to the column 130 of radiating elements 132 in order to feed sub-components of the RF signal to individual radiating elements 132 (or sub-arrays of radiating elements 132) and to apply an electrical downtilt, if desired, in the elevation plane.

Figure 12A:
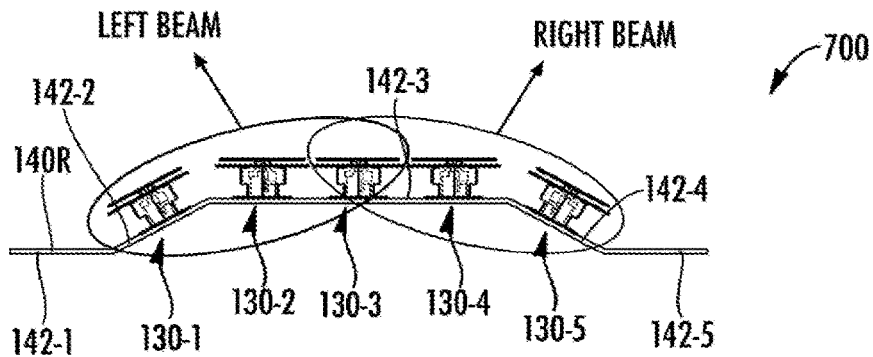
FIG. 12A is a transverse cross-sectional view of a modified version of the base station antenna of FIGS. 11A-11B that includes mechanical steering for two of the columns of radiating elements.
Figure 12B:
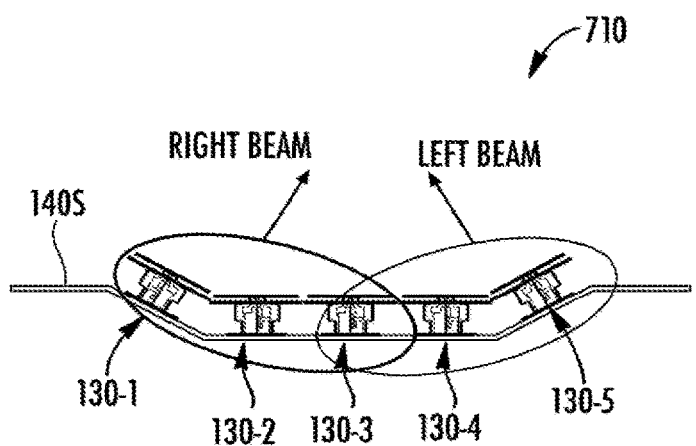
FIG. 12B is a transverse cross-sectional view of another modified version of the base station antenna of FIGS. 11A-11B that includes mechanical steering for two of the columns of radiating elements.
Figure 13:
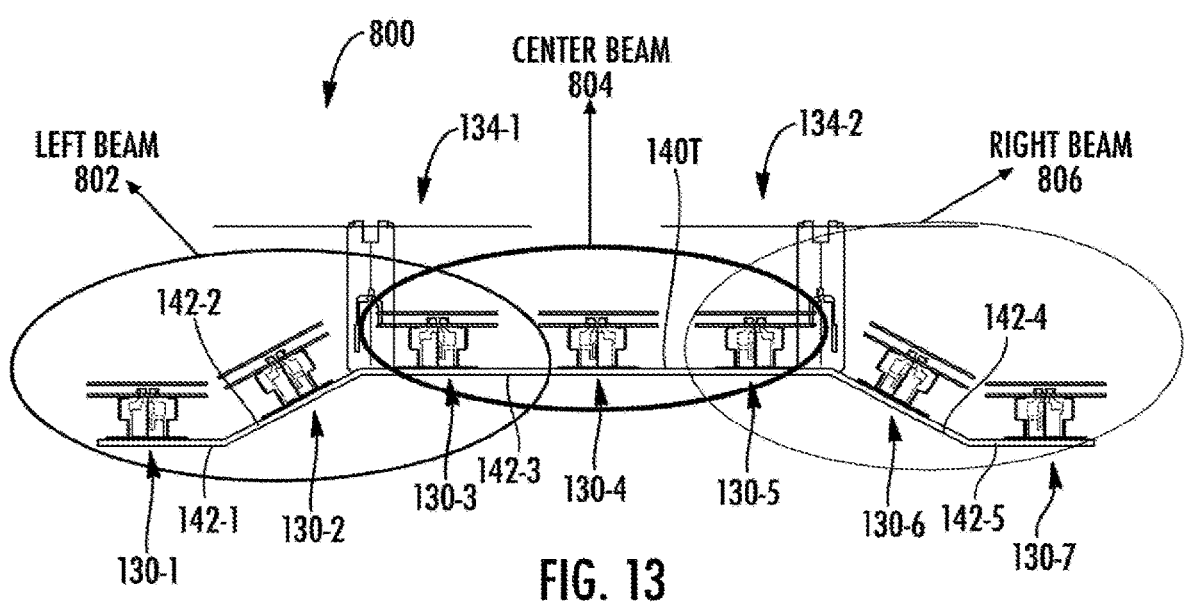
FIG. 13 is a transverse cross-sectional view of a tri-beam base station antenna according to embodiments of the present invention.

Referring next to FIGS. 12A and 12B, modified versions 700 and 710, respectively, of the base station antenna 600 are provided that add mechanical steering to the columns 130-1, 130-5 of radiating elements 132 that are not coupled to the beamforming network 620. In particular, as shown in FIG. 12A, the base station antenna 700 includes a reflector 140S that has five longitudinally extending sections 142-1 through 142-5. Longitudinally-extending section 142-3 is perpendicular to the azimuth boresight pointing direction of antenna 700, and has the three columns 130-2 through 130-4 of radiating elements that are coupled to the beamforming network 620 mounted thereon. Longitudinally-extending section 142-2 is angled rearwardly (e.g., by an angle of about 27°-30° in the azimuth plane) from the left side of longitudinally-extending section 142-3, and longitudinally-extending section 142-4 is angled rearwardly (e.g., by an angle of about 27°-30° in the azimuth plane) from the right side of longitudinally-extending section 142-3. This design may be used to eliminate the need to electrically steer columns 130-1 and 130-5 (or to reduce the amount of electrical steering required), which may result in improved antenna patterns.

One problem with using Butler Matrix style beamforming networks to implement a twin beam, sector-splitting antenna is that there may be considerable change in the azimuth pointing angle (i.e., the azimuth angle where peak gain occurs) as a function of frequency. For example, one conventional Butler Matrix style twin beam base station antenna that includes four columns of high-band radiating elements that operate in the 1.7-2.7 GHz frequency band may generate antenna beams having azimuth pointing directions of 29.5° at 1.7 GHz, 26.1° at 2.2 GHz and 22.7° at 2.7 GHz, for a spread in azimuth pointing direction of 6.8°. For such an antenna, the azimuth HPBW is 38.8° at 1.7 GHz, 33.2° at 2.2 GHz and 28.0° at 2.7 GHz, for a spread of 10.8°. The use of the antenna 300 of FIG. 7A according to embodiments of the present invention may provide some improvement (reduction) in the variation in the azimuth pointing angle, but at the expense of a corresponding increase in the azimuth HPBW. In particular, the antenna 300 of FIG. 7A generates antenna beams having azimuth pointing directions of 21.3° at 1.7 GHz, 24.5° at 2.2 GHz and 26.6° at 2.7 GHz, for a spread in azimuth pointing direction of 5.3°. For such an antenna, the azimuth HPBW is 43.2° at 1.7 GHz, 36.7° at 2.2 GHz and 31.9° at 2.7 GHz, for a spread of 11.3°.

Pursuant to further embodiments of the present invention, the phase slope of the power divider output transmission lines may be adjusted using Shiffman phase shifters, phase balance lines or the like to improve (reduce) the variation in azimuth pointing direction and the azimuth HPBW as a function of frequency. For example, a Shiffman phase shifter may be added at the output of the beamforming network. With this change, the antenna may generate antenna beams having azimuth pointing directions of 26.9° at 1.7 GHz, 25.7° at 2.2 GHz and 24.2° at 2.7 GHz, for a spread in azimuth pointing direction of only 2.7°. For such an antenna, the azimuth HPBW is 42.0° at 1.7 GHz, 36.6° at 2.2 GHz and 31.8° at 2.7 GHz, for a spread of 10.2°.

It will also be appreciated that the techniques described herein may be used in tri-beam antennas (or quad-beam antennas) as well as in twin beam antennas. For example, FIG. 13 as a schematic diagram illustrating a tri-beam antenna 800 according to embodiments of the present invention that may be viewed as a tri-beam implementation of the twin beam base station antenna 410 of FIG. 9B. The base station antenna 800 includes seven columns 130-1 through 130-7 of high-band radiating elements 132 that are mounted on a reflector 140U that includes five longitudinally-extending sections 142-1 through 142-5. Columns 130-3 and column 130-5 are shared columns of radiating elements. Thus, columns 130-1 through 130-3 may be used to generate a first antenna beam 802 that provides coverage to one third of a 120° sector, columns 130-3 through 130-5 may be used to generate a second antenna beam 804 that provides coverage to another third of the 120° sector, and columns 130-5 through 130-7 may be used to generate a third antenna beam 806 that provides coverage to the remaining third of the 120° sector. Columns 130-2 and 130-6 are mechanically steered (by about 35°-40°) which may help improve the shape of the first and third antenna beams 802, 806. The tri-beam antenna 800 further includes a pair of columns 134-1, 134-2 of low-band radiating elements 136. It will be appreciated that others of the twin beam antennas disclosed herein may similarly be modified to provide a variety of different tri-beam base station antennas.

The base station antennas described above include "columns" of radiating elements. Most typically, each "column" may comprise a vertically-oriented linear array of radiating elements where the radiating elements extend along a vertical axis. However, it will be appreciated that in some cases the columns may be so-called "staggered" linear arrays of radiating elements in which some of the radiating elements are offset horizontally from other of the radiating elements by a small amount. As explained in U.S. Provisional Patent Application Ser. No. 62/722,238, filed Aug. 24, 2018, the entire content of which is incorporated herein by reference, such staggered linear arrays may be included in base station antennas to, for example, improve the stability of the azimuth beamwidth across the frequency band of operation.

Figure 14A:
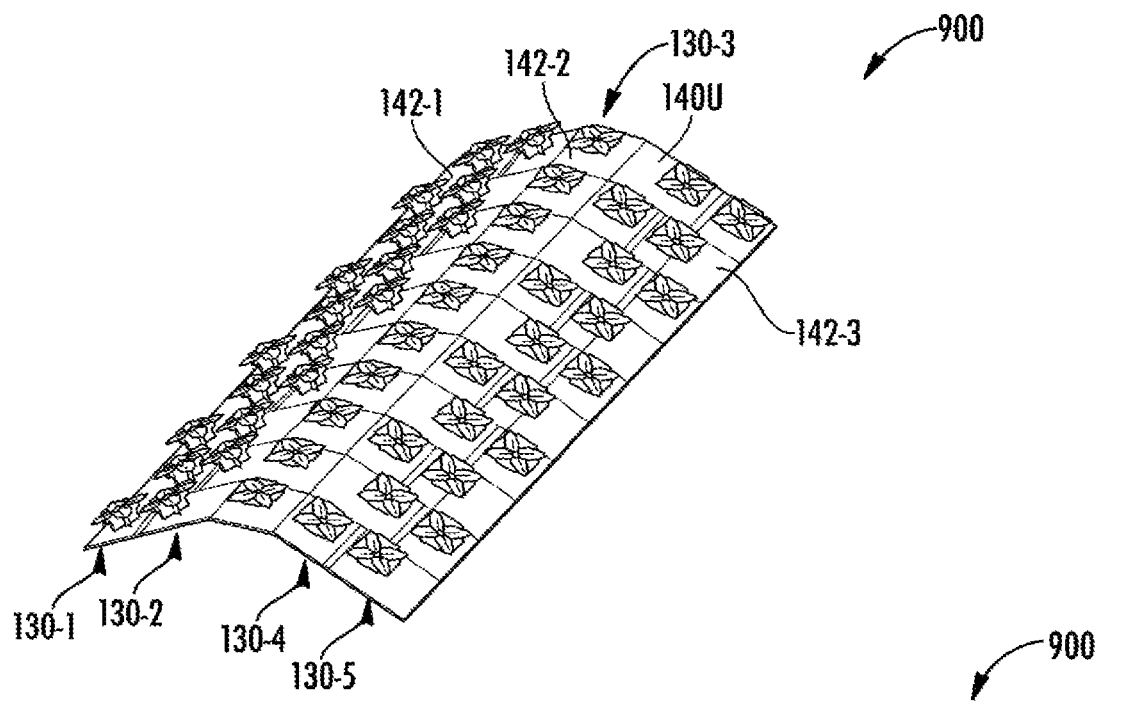
FIG. 14A is a schematic perspective view of a dual-band twin beam base station antennas according to still further embodiments of the present invention that include two staggered columns of high-band radiating elements that are mechanically-steered and which may optionally also be electrically-steered, with the optional two low-band columns of radiating elements omitted.
Figure 14B:
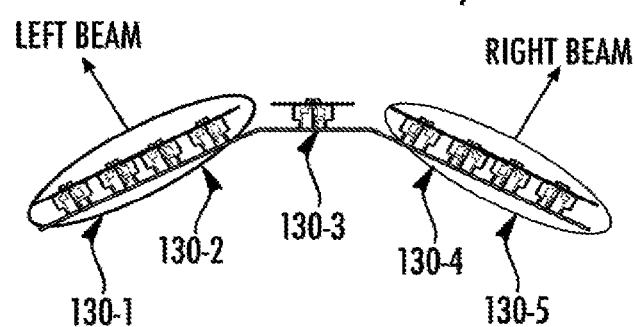
FIG. 14B is a schematic transverse cross-sectional of the base station antenna of FIG. 14A.
Figure 14C:
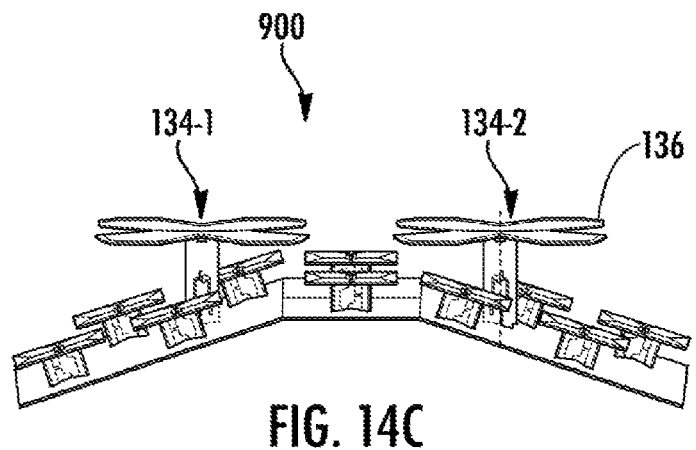
FIG. 14C is an isometric sectional view of the base station of FIGS. 14A-14B with a low-band radiating element from each column included in the view.

FIGS. 14A-14C illustrate a dual-band twin beam base station antenna 900 according to further embodiments of the present invention which includes such staggered columns of radiating elements. In particular, FIG. 14A is a schematic perspective view of the dual-band twin beam base station antenna 900 (with the columns of low-band radiating elements omitted), FIG. 14B is a schematic transverse cross-sectional of FIGS. 14A, and 14C is an isometric sectional view of the base station 900 with a low-band radiating element from each column included in the view.

As shown best in FIG. 14A, the base station antenna 900 includes five columns 130-1 through 130-5 of high-band radiating elements 132. The columns 130 of high-band radiating elements 132 are mounted to extend forwardly from a shaped reflector 140U. The high-band radiating elements 132 forming columns 130-1, 130-2, 130-4 and 130-5 are each staggered columns of radiating elements 132 in which every other radiating element 132 in each column 130 is offset in the horizontal direction from the adjacent radiating elements 132 in the column 130 by a small amount. Columns 130-1 and 130-2 are coupled to first and second RF ports (not shown) via a first common feed network (not shown) and together form a first array of high-band radiating elements 132 that generate first slant −45° and slant +45° polarization antenna beams. Columns 130-4 and 130-5 are coupled to third and fourth RF ports (not shown) via a second common feed network (not shown) and together form a second array of high-band radiating elements 132 that generate second slant −45° and slant +45° polarization antenna beams. Column 130-3 is coupled to fifth and sixth RF ports (not shown) via a third feed network (not shown) and generates third slant −45° and slant +45° polarization antenna beams. The staggering of columns 130-1 and 130-2 acts to narrow the azimuth beamwidth of the first array so that the first antenna beams generated by the first array each have an azimuth HPBW of about 33°. Similarly, the staggering of columns 130-4 and 130-5 acts to narrow the azimuth beamwidth of the first array so that the first antenna beams generated by the first array each have an azimuth HPBW of about 33°. Thus, the first and second antenna beams are each sized to cover a sub-sector of a 120° sector. The third antenna beams may have an azimuth HPBW of about 65° and may cover the full sector.

The reflector 140U includes first through third longitudinally-extending sections 142-1 through 142-3. Longitudinally-extending section 142-2 is mounted to extend perpendicularly to an azimuth boresight pointing direction of the base station antenna 900, while longitudinally-extending sections 142-1 and 142-2 are angled with respect to longitudinally-extending section 142-2. As a result, the first antenna beams generated by columns 130-1, 130-2 of high-band radiating elements 132 are mechanically steered to the left in the azimuth plane to cover the left sub-sector, and the second antenna beams generated by columns 130-4, 130-5 of high-band radiating elements 132 are mechanically steered to the right in the azimuth plane to cover the right sub-sector. In some embodiments, the staggered columns 130-1, 130-2; 130-4, 130-5 of high-band radiating elements 132 forming the first and second arrays may be mechanically steered by about 27° (by angling the reflector sections 142-1, 142-3 with respect to reflector section 142-2) so that electrical steering of the first and second antenna beams is not required. In other embodiments, the staggered columns 130-1, 130-2; 130-4, 130-5 of high-band radiating elements 132 forming the first and second arrays may be mechanically steered by less than, for example, 27° (e.g., between 10°-25°) and the first and second antenna beams may be electrically steered the remaining distance in the azimuth plane in order to point toward the middle of their respective sub-sectors.

The antenna 900 further includes two linear arrays 134-1, 134-2 of low-band radiating elements 136, as shown in FIG. 14C. Low-band array 134-1 may be generally aligned with staggered high-band array 130-2, and low-band array 134-2 may be generally aligned with staggered high-band array 130-4. The two low-band linear arrays 134-1, 134-2 may operate as sector (as opposed to sector-splitting) arrays that provide service in different frequency bands or that operate as a 4×MIMO antenna in the same frequency band It will be appreciated that the present specification only describes a few example embodiments of the present invention and that the techniques described herein have applicability beyond the example embodiments described above. It should also be noted that the antennas according to embodiments of the present invention may be used in applications other than sector-splitting such as, for example, in venues such as stadiums, coliseums, convention centers and the like. In such applications, the multiple beams are more usually configured to cover a 60°-90° sector.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A twin beam base station antenna, comprising:
a first radio frequency ("RF") port;
a second RF port;
an array that includes a plurality of columns of first frequency band radiating elements that are configured to form an antenna beam that provides coverage to a predefined area; and
a beamforming network coupled between the first and second RF ports and the array, the beamforming network including a first frequency dependent power divider,
wherein the beamforming network includes a 90° hybrid coupler having a first input coupled to the first RF port, a second input coupled to the second RF port, a first output coupled to the first frequency dependent power divider and a second output coupled to a second frequency dependent power divider, and
wherein a first output of the first frequency dependent power divider is coupled to a first of the first frequency band radiating elements through a 180° phase shifter and a second output of the first frequency dependent power divider is coupled to a second of the first frequency band radiating elements.

2. The twin beam base station antenna of claim 1, wherein a first output of the second frequency dependent power divider is coupled to a third of the first frequency band radiating elements through a second 180° phase shifter and a second output of the second frequency dependent power divider is coupled to a fourth of the first frequency band radiating elements.

3. The twin beam base station antenna of claim 1, wherein the first frequency dependent power divider comprises a power divider having a filter on a first output thereof.

4. The twin beam base station antenna of claim 1, wherein the first frequency dependent power divider comprises a power divider that has a first output coupled to a first input of a 90° hybrid coupler and a second output that is coupled to a second input of the 90° hybrid coupler via a delay line.

5. The twin beam base station antenna of claim 1, wherein the array includes a total of four columns of first frequency band radiating elements.

6. The twin beam base station antenna of claim 1, wherein the array includes a total of five columns of first frequency band radiating elements.

7. A twin beam multi-band base station antenna that is configured to provide coverage to a sector of a three-sector base station, comprising:
a low-band radio frequency ("RF") port;
a first high-band RF port;
a second high-band RF port;
a backplane that includes a reflector, the reflector having a first longitudinally extending section that is perpendicular to an azimuth boresight pointing direction of the base station antenna, a second longitudinally extending section that is angled at least 15° from the first longitudinally extending section, and a third longitudinally extending section that is angled at least 15° from the first longitudinally extending section, the first longitudinally extending section positioned between the second longitudinally extending section and the third longitudinally extending section,
a column of low-band radiating elements that is coupled to the low-band RF port via a low-band feed network;
a first high-band array that includes at least three columns of high-band radiating elements that are coupled to the first high-band RF port via a first high-band feed network, the first high-band array mounted to extend forwardly from the second longitudinally extending section of the reflector; and
a second high-band array that includes at least three columns of high-band radiating elements that are coupled to the second high-band RF port via a second high-band feed network, the second high-band array mounted to extend forwardly from the third longitudinally extending section of the reflector.

8. The twin beam multi-band base station antenna of claim 7, wherein the first high-band array is mounted to extend forwardly from the first longitudinally extending section of the reflector.

9. The twin beam multi-band base station antenna of claim 7, wherein the reflector is a generally V-shaped reflector.

10. The twin beam multi-band base station antenna of claim 7, wherein the second and third longitudinally extending sections of the reflector extend forwardly from the first longitudinally extending section of the reflector.

11. The twin beam multi-band base station antenna of claim 7, wherein the second and third longitudinally extending sections of the reflector extend rearwardly from the first longitudinally extending section of the reflector.

12. The twin beam multi-band base station antenna of claim 7, wherein the first high-band array is configured to form a first antenna beam that provides coverage throughout a sub-sector having a first azimuth half power beamwidth, the twin beam multi-band base station antenna further comprising an additional column of high-band radiating elements, the additional column of high-band radiating elements configured to generate a fourth antenna beam having an azimuth half power beamwidth that is about twice the first azimuth half power beamwidth.

13. A twin beam base station antenna that is configured to split a sector of a three-sector base station into first and second sub-sectors, comprising:
a first array that includes first and second vertical columns of first frequency band radiating elements that are mechanically steered in a first direction in the azimuth plane from an azimuth boresight pointing direction of the twin beam base station antenna, wherein at least some of the radiating elements in the first column are staggered in the horizontal direction from other of the radiating elements in the first column, and wherein at least some of the radiating elements in the second column are staggered in the horizontal direction from other of the radiating elements in the second column; and a second array that includes third and fourth vertical columns of first frequency band radiating elements that are mechanically steered in a second direction in the azimuth plane from an azimuth boresight pointing direction of the twin beam base station antenna, wherein at least some of the radiating elements in the third column are staggered in the horizontal direction from other of the radiating elements in the third column, and wherein at least some of the radiating elements in the fourth column are staggered in the horizontal direction from other of the radiating elements in the fourth column, and that are electrically steered further in the first direction, wherein the first array is configured to form a first antenna beam that provides coverage throughout the first sub-sector, and the second array is configured to form a second antenna beam that provides coverage throughout the second sub-sector.

14. The twin beam base station antenna of claim 13, wherein the second direction is rotationally opposite the first direction.

15. The twin beam base station antenna of claim 14, wherein the first and second columns of first frequency band radiating elements are electrically steered further in the first direction, and the third and fourth columns of first frequency band radiating elements are electrically steered further in the first direction.

* * * * *